US008982682B2

(12) United States Patent
Watanabe et al.

(10) Patent No.: US 8,982,682 B2
(45) Date of Patent: Mar. 17, 2015

(54) INFORMATION PROCESSING SYSTEM

(71) Applicant: Hitachi, Ltd., Chiyoda-ku, Tokyo (JP)

(72) Inventors: Takao Watanabe, Fuchu (JP); Toshimichi Shintani, Kodaira (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 13/740,372

(22) Filed: Jan. 14, 2013

(65) Prior Publication Data

US 2013/0194902 A1     Aug. 1, 2013

Related U.S. Application Data

(62) Division of application No. 12/979,273, filed on Dec. 27, 2010, now abandoned.

(30) Foreign Application Priority Data

Dec. 28, 2009   (JP) .................................. 2009-296679

(51) Int. Cl.
G11B 7/004    (2006.01)
G11B 7/085    (2006.01)
G11B 7/005    (2006.01)
G11B 11/14    (2006.01)
G11B 7/00     (2006.01)

(52) U.S. Cl.
CPC ................ *G11B 7/085* (2013.01); *G11B 7/005* (2013.01); *G11B 11/14* (2013.01); *G11B 2007/0009* (2013.01)
USPC ........... 369/94; 369/103; 369/275.4; 365/120

(58) Field of Classification Search
None
See application file for complete search history.

(56) References Cited

U.S. PATENT DOCUMENTS

| 5,483,365 | A   |   | 1/1996  | Pu et al.        |          |
|-----------|-----|---|---------|------------------|----------|
| 5,694,249 | A   | * | 12/1997 | Misawa           | 359/620  |
| 5,761,111 | A   |   | 6/1998  | Glezer           |          |
| 5,847,565 | A   |   | 12/1998 | Narayanan        |          |
| 6,479,214 | B1  | * | 11/2002 | Albaum et al.    | 430/270.15 |
| 6,707,776 | B2  | * | 3/2004  | Nagata et al.    | 369/59.25 |
| 6,879,637 | B1  |   | 4/2005  | Nakagawa et al.  |          |

(Continued)

FOREIGN PATENT DOCUMENTS

| JP | 06-076374 A  | 3/1994 |
| JP | 11-102584 A  | 4/1999 |

(Continued)

OTHER PUBLICATIONS

Glezer et al., "Three-dimensional optical storage inside transparent materials," *Optics Letters*, Dec. 1996, 21(24): pp. 2023-2025.
Rosenfeld et al., "Digital Picture Processing", Second Edition, vol. 1, Academic Press Inc., Section 8, pp. 353-430.
Slichter, C.P., "Principles of Magnetic Resonance", 3rd Edition, Springer-Verlag, 1990, Sections 1 and 2, pp. 1-59.

*Primary Examiner* — Wayne Young
*Assistant Examiner* — Brian Butcher
(74) *Attorney, Agent, or Firm* — Miles & Stockbridge P.C.

(57) ABSTRACT

An information storage device has small compartments for storing information in a solid body and can be used as a memory medium. The solid body can have at least one pair of parallel planar portions on its surface. The information is divided into bits and stored in discrete minute areas that are distributed three-dimensionally inside the memory medium. The data can be converted into a digital format for storage to regulate the number of '1s' recorded in a direction of the memory medium.

20 Claims, 16 Drawing Sheets

(56) References Cited

U.S. PATENT DOCUMENTS

| | | |
|---|---|---|
| 7,321,540 B2 | 1/2008 | Goulanian et al. |
| 7,568,365 B2 | 8/2009 | Schaffer et al. |
| 7,732,235 B2 | 6/2010 | Scheuerlein et al. |
| 2009/0116363 A1 | 5/2009 | Watanabe et al. |
| 2009/0154304 A1 | 6/2009 | Watanabe et al. |

FOREIGN PATENT DOCUMENTS

| | | |
|---|---|---|
| JP | 11-337756 A | 12/1999 |
| JP | 3011378 B2 | 2/2000 |

* cited by examiner

FIG. 3

| DECIMAL NUMBER | 8-BIT BINARY NUMBER | 4/9-BIT FORMAT |
|---|---|---|
| 0 | 00000000 | 000000000 |
| 1 | 00000001 | 000000001 |
| 2 | 00000010 | 000000010 |
| ⋮ | | |
| 8 | 00001000 | 010000000 |
| 9 | 00001001 | 100000000 |
| 10 | 00001010 | 000000011 |
| 11 | 00001011 | 000000101 |
| ⋮ | | |
| 44 | 00101100 | 101000000 |
| 45 | 00101101 | 110000000 |
| 46 | 00101110 | 000000111 |
| 47 | 00101111 | 000001101 |
| ⋮ | | |
| 128 | 10000000 | 110100000 |
| 129 | 10000001 | 111000000 |
| 130 | 10000010 | 000001111 |
| 131 | 10000011 | 000011101 |
| ⋮ | | |
| 254 | 11111110 | 101110000 |
| 255 | 11111111 | 111100000 |

FIG. 4

| DECIMAL NUMBER | 8-BIT BINARY NUMBER | 5/20-BIT FORMAT |
|---|---|---|
| 0 | 0000 0000 | 000000000000000*0000*1 |
| 1 | 0000 0001 | 00000000000000*0000*10 |
| 2 | 0000 0010 | 0000000000000*0000*100 |
| ⋮ | | |
| 7 | 0000 0111 | 00000000*0000*10000000 |
| 8 | 0000 1000 | 0000000*0000*100000000 |
| 9 | 0000 1001 | 000000*0000*1000000000 |
| ⋮ | | |
| 15 | 0000 1111 | *0000*1000000000000000 |
| 16 | 0001 0000 | 000000000000000*0001*1 |
| 17 | 0001 0001 | 00000000000000*0001*10 |
| ⋮ | | |
| 127 | 0111 1111 | *0111*1000000000000000 |
| 128 | 1000 0000 | 000000000000000*1000*1 |
| 129 | 1000 0001 | 00000000000000*1000*10 |
| ⋮ | | |
| 254 | 1111 1110 | 0*1111*100000000000000 |
| 255 | 1111 1111 | *1111*1000000000000000 |

INFORMATION PROCESSING SYSTEM

CROSS-REFERENCE TO RELATED APPLICATIONS

The present application is a division of U.S. application Ser. No. 12/979,273, filed Dec. 27, 2010, which is hereby incorporated by reference herein in its entirety.

CLAIM OF PRIORITY

The present application claims priority from Japanese patent application JP 2009-296679 filed on Dec. 28, 2009, the content of which is hereby incorporated by reference into this application.

FIELD OF THE INVENTION

The present invention relates to an information processing system, and more specifically, to a data arrangement method and a data expression method for realizing reliability of reading of data, shortening of a data record time, improvement in recording density, etc. when the data is recorded discretely and three-dimensionally in the interior of a solid medium and read intact using absorption of an electromagnetic wave passing through it and a resonance echo.

BACKGROUND OF THE INVENTION

Realization of higher performance of devices that deal with digital information, such as image and voice, are advancing rapidly and in connection with it, a progress of information storage devices for storing the digital information is also remarkable. As typical information storage devices, there are semiconductor memory, a hard disk, an optical disk, etc. Fundamentally, each of them is one in which elements each for storing information are arranged two-dimensionally, and higher density integration and a lower cost thereof have been achieved mainly by relying on advances of an ultra-fine processing technology. However, it becomes difficult gradually to establish a finer processing technology, and it is said that rapid advancing of higher integration and lower cost is not easy.

As one means for solving this problem, it is considered that storage elements are arranged three-dimensionally, not two-dimensionally. Such examples are described in JP-A-H11 (1999)-337756, JP-A-H06 (1994)-076374, and JP-A-H11 (1999)-102584. JP-A-H11 (1999)-337756 describes a read only memory card using multi-layered optical waveguide constructed by laying planar-type optical waveguides one on top of another to form a multilayer. JP-A-H06 (1994)-076374 describes a storage device that uses a cylindrical glass or plastic as storage media and reads information from it using a computer tomography technology. Moreover, JP-A-H11 (1999)-102584 describes an example of three-dimensional memory that uses a resonance phenomenon of a nuclear spin placed in a magnetic field etc.

Incidentally, as documents relevant to the present invention, there are "Digital Picture Processing," Second Edition, Volume 1, Ariel Rosenfeld, and Avinash C. Kak, Academic Press Inc., Section 8, pp. 353~430, C. P. Slichter, "Principles of Magnetic Resonance," 3rd Edition, Springer-Verlag, 1990, Sections 1 and 2, pp. 1~59, and Japanese Patent No. 3011378. "Digital Picture Processing," Second Edition, Volume 1, Ariel Rosenfeld, and Avinash C. Kak, Academic Press Inc., Section 8, pp. 353~430" describes details about a principle of the computer tomography technology. Furthermore, C. P. Slichter, "Principles of Magnetic Resonance," 3rd Edition, Springer-Verlag, 1990, Sections 1 and 2, pp. 1~59 explain a resonance phenomenon in the magnetic field. Japanese Patent No. 3011378 describes a resonant circuit consisting of a minute coil and a capacitance and its manufacture method.

SUMMARY OF THE INVENTION

JP-A-H11 (1999)-337756 describes an example of a multilayer waveguide playback-only memory card obtained by laying planar-type optical waveguides one on top of another to form a multilayer, in which side faces of each layer is cut at a slope angle of 45° to a normal of the waveguide plane. Moreover, the multi-layers are shifted so that the above-mentioned cut planes of respective layers may not overlap one another when seeing from the above-mentioned normal direction. Therefore, if light is made to fall on the cut plane of a layer that is intended to be selected from the above-mentioned normal side (from a top side of the waveguide planes that are built up), the light is made to enter the waveguide plane of the selected layer after the light is reflected at the cut plane. The light that entered the selected waveguide plane is scattered by concavo-convex formed in the waveguide. Generation positions of the scattered light are read as a two-dimensional pattern using a lens and a two-dimensional photo detector. In this system, a pattern of the scattered light from the selected layer can be read by putting a focus of the lens on the selected cut plane.

However, if a layer far from the photo detector is selected, since the scattered light will pass through the layer that was not selected, absorption in the unselected layer and scattering at the concavo-convex will occur. Although the influence of this scattering seldom causes a problem when the number of layers is small, but when the number of layers increases, the intensity of the scattered light from the selected layer will decrease by absorption of the light, and on the other hand, the influence of light scattering in the unselected layer will become larger. For this reason, there is a possibility that an SN ratio in the photo detector will fall and the reading of the signal will become impossible.

Moreover, JP-A-H06 (1994)-076374 describes an embodiment that uses a cylindrical shape of glass or plastic. It describes that small partitions each having different transmittance of light are provided three-dimensionally in the interior of this medium, whereby information is stored. Although a concrete description as to how to vary the transmittance of light in the small partitions, i.e., how to write information cannot be found, a method as follows is described about the reading.

A laser beam is entered a cylindrical medium in its diameter direction, and the intensity is measured by a light receiving part placed on the opposite side. Then, the cylindrical medium is rotated around its central axis, and the transmittance is measured. Here, the central axis refers to an axis penetrating the center of a circle of the cylindrical medium. Based on the data of the transmitted light measured during one rotation described above, the transmittance of individual small segment that distributes in the cross-sectional circle is found by an arithmetic processing. It is explained that by performing this work while the cylinder is being moved in the rotation axis direction, information stored in the interior of the cylinder is read. In the embodiment of JP-A-H06 (1994)-076374, since a laser beam is made to enter the cylinder in the diameter direction thereof, there does not occur a problem that when the length of the cylinder in the rotation axis direction is made large, the SN ratio of a signal deteriorates.

However, with a configuration of the embodiment described in this document, it is impossible to find transmittances of all small segments that distribute in the interior of the cross-sectional circle by an arithmetic operation. The cause lies in a fact that a light emitting part of the laser beam and a light receiving part are arranged in the diameter direction of the cylinder. With this arrangement, one rotation of the cylinder enables only a measurement of the transmittance in the diameter direction. As is well known, in computer tomography of finding a cross-sectional structure by the arithmetic operation, what is required is not only information of a line in the diameter direction passing through the center but also transmittances of a large number of lines parallel to it. Therefore, with the configuration of JP-A-H06 (1994)-076374, the data that distributes three-dimensionally in the cylindrical medium cannot be read correctly. A principle of the computer tomography is described in Section 8 of "Digital Picture Processing," Second Edition, Volume 1, Ariel Rosenfeld, and Avinash C. Kak, Academic Press Inc., Section 8, pp. 353–430.

Incidentally, although not described in JP-A-H06 (1994)-076374, it is considerable that in order to find the cross-sectional structure by the computer tomography technology, a laser beam is made to enter the cylindrical medium being shifted from the center thereof. However, the configuration of JP-A-H06 (1994)-076374 has a possibility that correct information cannot be obtained. This is because when the transmittance of light parallel to the diameter that is required in the computer tomography is intended to be measured, if the laser beam is made to enter a place away from the center, an optical path will be bent largely due to refraction of the light on the surface of the cylinder because the medium is in the cylindrical shape and the incident light is the laser beam.

From the above, the embodiment described in JP-A-H06 (1994)-076374 comes with a possibility that it cannot acquire correct cross section information by applying the principle of the computer tomography. Moreover, JP-A-H06 (1994)-076374 does not show a method whereby the data is written in the storage media.

JP-A-H11 (1999)-102584 describes one that uses liquid water or solid polymethyl methacrylate as the storage media. In this system, the writing is performed by applying the magnetic field having a three-dimensional gradient to uniform storage media, such as water, thereby controlling a resonant frequency, and making the storage media absorb locally an electromagnetic wave of a different frequency. The reading is performed by reading the electromagnetic wave emitted from a hydrogen atom etc. within a relaxation time of a resonance phenomenon. It is considered that this system is advantageous to higher integration because of the use of a three-dimensional space compared with the conventional two-dimensional information storage device. However, this system has a problem that if the relaxation time elapses before the reading, an external magnetic field is cut, or the medium is taken to an environment of no magnetic field, the stored information will disappear.

As described above, the conventional information storage device lacks sufficient consideration about fundamental functions, which causes problems with respect to the reading of three-dimensional information, retention of the information, etc.

In view of what was described above, the inventors examined the three-dimensional information storage device. As a result, the inventors have come to think that it is naturally necessary to solve the fundamental problems in the patent document, and in addition to this, considerations are needed for a data arrangement method and a data coding method in order to realize improvement in the reliability of the reading of the data, shortening of the data record time, increase of storage capacity, etc.

The present invention is made in view of such a problem. The above-mentioned and other objects of the present invention and new features will become clear from description of this specification and accompanying drawings.

Outline of typical aspects of the invention disclosed in this application will be explained as the following.

A tabular solid body that has at least one set of parallel planar portions on its surface is used as a memory medium. The information to be stored is stored in discrete minute areas that are distributed three-dimensionally inside the memory medium being divided into bits.

The minute area is hereinafter called a memory cell. Bit information is recorded in the memory cell area by changing transmittance of an electromagnetic wave irradiated from the outside.

Here, information of the memory cell in the part where the characteristic has changed is defined as '1' and information of the memory cell in the part where the characteristic has not changed is defined as '0.' Reading of the recorded information is performed as follows. First, an intensity of the electromagnetic wave that is transmitted through the planar portion is observed as a projection image while varying the angle that the planar portion and an irradiating electromagnetic wave make. Next, bit information is read by calculating a desired cross-sectional image through an arithmetic processing of those pieces of data and thereby finding a difference of the transmittance of the electromagnetic wave in the memory cell portions on the cross section. Anisotropy is given to the pitch of the memory cell and the pitch in a direction perpendicular to the planar portion is larger than the pitch in a direction parallel thereto.

Moreover, an area included in a portion on which the electromagnetic wave always falls during the rotation is used as a record area. Furthermore, a text code or binary code that is represented using given n-bits as a unit is converted to a digital format such that m-bits larger than n-bits are used as a unit and the number of included '1s' is smaller than n, and is recorded in the memory medium. When reading the code, it is converted to the original text code or binary code and is outputted. When recording the data in the medium, the data expressed by the m-bits are aligned in a right-angled direction of the above-mentioned plate and are recorded.

Explaining briefly an effect that can be obtained by a representative aspect of the invention among aspects of the invention disclosed by the present application, stable reading becomes possible using a technique of computer tomography.

BRIEF DESCRIPTION OF THE DRAWINGS

FIG. 3 is a diagram showing one example of a method for expressing the stored data of the present invention;

FIG. 4 is a diagram showing another one example of a method for expressing the stored data of the present invention;

DETAILED DESCRIPTION OF THE PREFERRED EMBODIMENTS

First Embodiment

Figure 1A:
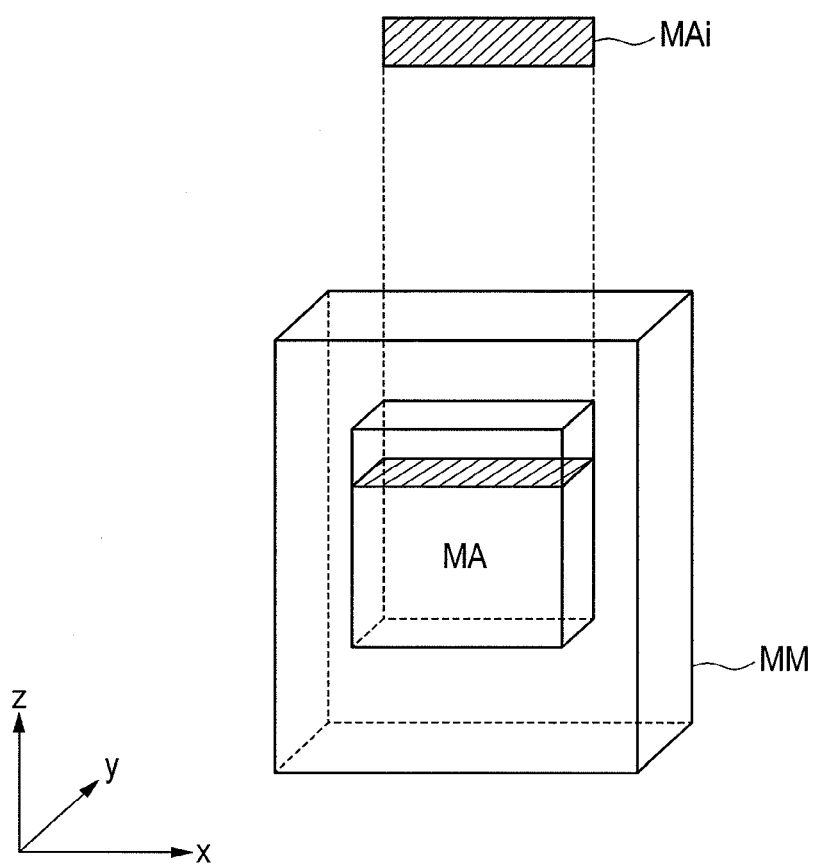
FIG. 1A is one embodiment showing a shape of a memory medium of the present invention.

Hereafter, an embodiment of the present invention will be explained in detail based on drawings. Incidentally, in all diagrams for explaining the embodiment, the same reference numeral is given to the same member as a rule and repeated explanation of it is omitted. Moreover, drawings and explanations of the present invention are simplified for the purpose of illustrating necessary constituents in order to make the present invention clear to understand, and at the same time, other constituents that are considered to be well known are excluded in order to make the illustration and explanations plain. It will be understood by the person skilled in the art that other constituents that are not illustrated are desirable or necessary in order to carry out the present invention. However, since such constituents are well known in the technology concerned and explanations of such constituents will not be provided in this specification because they do not help the reader to better understand the present invention.

First, what kind of arrangement is used to arrange three-dimensional data of a plurality of layers in a memory medium in the present invention will be explained using the embodiment. FIG. 1A shows one embodiment of a shape of the memory medium. In this figure, MM denotes the memory medium, and MA is an area that records the data in the interior thereof. MAi denotes two-dimensional data of an i-th layer in the interior of the MA, and records the three-dimensional data using the plurality of layers. As shown in FIG. 1A, the memory medium MM is in a tabular shape whose plane parallel to the sheet plane (an x-z plane) is the largest and whose plane in a depth direction (a y-axis direction) is small. As materials of the memory medium MM, organic substances, such as a transparent plastics and glasses can be used, for example. Since these have high transmittances to light of a wide range of wavelengths, these are suitable when reading information with light. Although the plastics are lightweight and excel in shock resistance, the glasses generally excel in long-term preservability, and consequently it is recommendable to select glass or plastic according to operating conditions. Incidentally, fused silica has a small thermal expansion among glasses, and has a high transmittance in a wide range of wavelengths ranging from infrared light to ultraviolet light. For this reason, a reading mistake arising from expansion accompanying a temperature change does not occur easily, and it can endure rapid temperature changes, such as a fire. Therefore, it is suitable as a material of the memory medium MM of the present invention.

Moreover, it is also considerable that depending on the case, a material harder than fused silica and also strong against high temperatures is required. In that case, for example, a crystal of sapphire, i.e., aluminum oxide (alumina), can also be used. A transparent artificial crystal of aluminum oxide is the hardest next to diamond, and also its melting point exceeds 2000° C. For this reason, it is possible to make a memory medium MM stronger than fused silica and robust in high temperatures. Naturally, as long as a material has the permeability to a wavelength of light that is used for the writing and reading and is robust, the material other than this can be used. For example, it is possible to use ceramics having transparency among ceramics, such as zirconia stabilized by additives and polycrystalline alumina, and other artificial materials. Generally, since these are cheaper than single crystal alumina, they have a merit that a price of the medium can be lowered.

As a merit of the form of the memory medium being tabular, the followings are enumerated. First, since a tabular memory medium only needs polishing on two planes compared with polishing of a polygonal pillar, a cylinder, etc., manufacture and inspection are easy and can be manufactured at a low price. Moreover, even if scratching occurs on the surface or surface flatness and transparency are impaired due to some cause during a long period of storage, it is easy to re-grind it so that it may be readable. Furthermore, since sides that are not used for transmission of light are allowed to be touched when handling the memory medium, it is easy to handle. Moreover, there is also a merit that storage capacity can be made small compared with a cylindrical medium when a plurality of media are housed because gaps between one another can be made small.

Next, a method for reliably reading the data using the tabular memory medium will be explained. Although not illustrated in the figure, in this embodiment, information is recorded in minute areas that distribute three-dimensionally (hereinafter, called memory cells) in the interior of the memory area MA. In an area in which a bit '1' is intended to be written, short-time pulse laser light, such as of a femtosecond laser, is focused thereonto using a lens to cause modification (hereinafter called a dot) of a change of the refractive index, a minute flaw, or the like in that portion. In an area that is intended to be a bit '0,' the laser is not made to fall on there, and the area is kept as it is. The reading of data is performed by finding a three-dimensional distribution of the dots written as described above using computer tomography. For this purpose, projection images are taken by making parallel rays fall thereon while the medium is being rotated little by little as will be described later. In the conventional computer tomography, in order to calculate a cross-sectional image, the projection images of one rotation are used. Since the projection images for one rotation enables all the two-dimensional Fourier components of a cross-sectional image that is wished to obtain to be obtained, performing two-dimensional inverse Fourier transformation on it makes it possible to obtain the cross-sectional image. However, if the tabular memory medium is used, restrictions are put on a rotation angle, and consequently there is a case where only a part of the Fourier components of the cross-sectional image that is desired may be able to be used. In such a case, only angles near the front will be able to be used. With this limitation, the Fourier components in the depth direction of the cross section, i.e., in a direction near the y-axis, will not be obtained. As a result, it is apprehended that spatial resolution in the depth direction of the cross section becomes low. As its measure, a pitch of the memory cell in the y-direction (depth direction) is enlarged to a pitch in the x-direction.

Figure 1B:
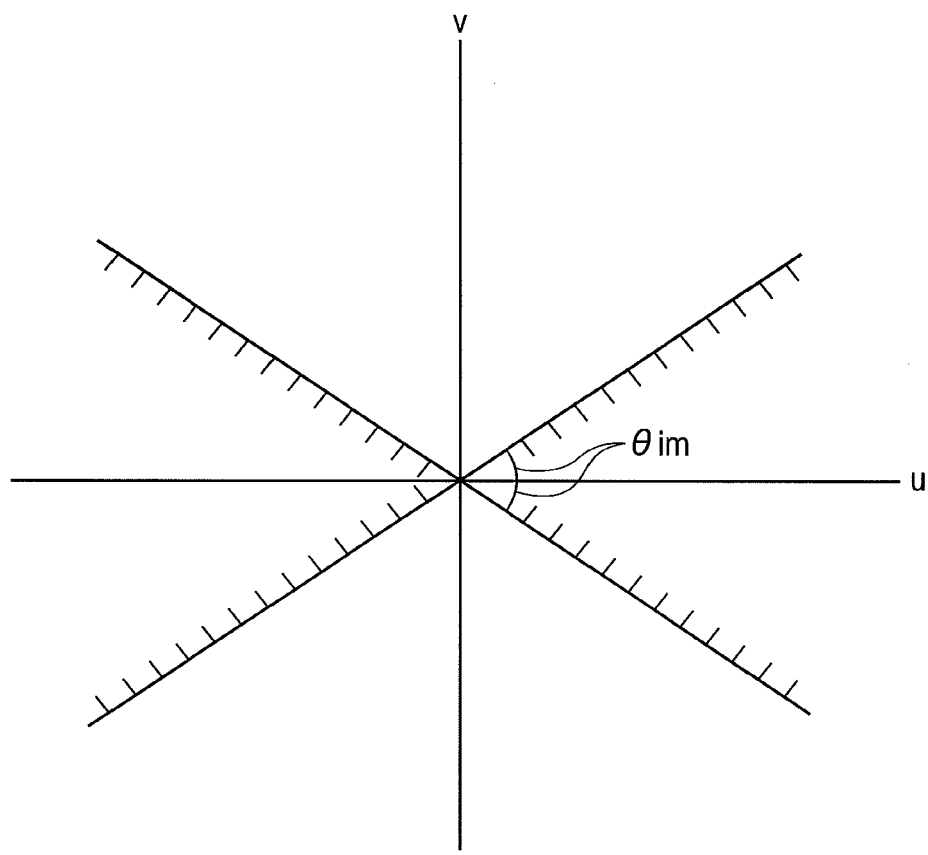
FIG. 1B is a diagram for explaining a range of two-dimensional Fourier components of a cross-sectional image obtained from a projection image in the case where a rotation angle of the memory medium is limited.

The problem will be explained using FIG. 1B. FIG. 1B shows a two-dimensional Fourier space of a cross-sectional image that is intended to be restored. In FIG. 1B, a u-axis and a v-axis are axes of the Fourier space corresponding to the x-direction and the y-direction of the memory medium, respectively. Since detailed explanations using mathematical expressions are described in "Digital Picture Processing," Second Edition, Volume 1, Ariel Rosenfeld, and Avinash C. Kak, Academic Press Inc., Section 8, pp. 353-430, etc., they are omitted. If the projection image at an angle θ is one-dimensional Fourier transformed, its result will become a Fourier component on a straight line intersecting the u-axis at the angle θ in the two-dimensional Fourier space of FIG. 1B. Therefore, as shown in FIG. 1B, it is found that if the rotation angel is limited by ±$\theta_{im}$, the Fourier components of the v-axis direction, i.e., the depth direction, cannot be obtained so much. As a result, spatial resolution in the depth direction of the cross section becomes low.

Figure 1C:
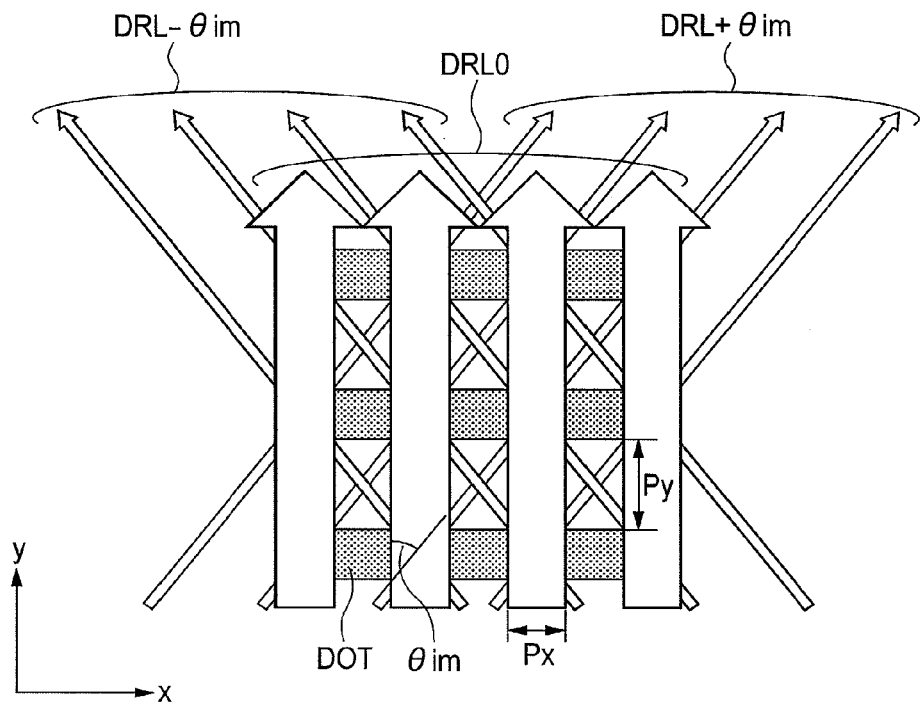
FIG. 1C is an embodiment showing anisotropy of a pitch of three-dimensionally stored data of the present invention.

Below, an embodiment that gives anisotropy to the pitch of the memory cell as a measure against the problem will be explained using FIG. 1C and a formula. Incidentally, although the following explanation will be given paying attention to one cross section, the MAi, it should be noted that the stored dot DOT exists over a plurality of cross sections.

Since the area that stores the data '1,' i.e., the dot DOT is discrete, what is necessary in order to clearly separate the dot DOT on the cross section is to have a capability of separating the dot DOT of the minimum pitch with "direct rays" that are directly transmitted through between the dots being free of absorption and scattering of the dot DOT. First, regarding the x-direction of the dot DOT, what is necessary is just to set the pitch to be able to be separated in the projection image obtained when the rotation angle is 0°. On the other hand, regarding the y-direction, the dot DOT needs only to be able to be separated in the y-direction using slanting direct rays as shown in FIG. 1C at least at the maximum $\theta_{im}$ when the medium is rotated laterally. Here, it should be noted that to be precise, $\theta_{im}$ is a maximum of the angle $\theta_i$ that the light in the interior of the medium and the normal of the incidence plane make, and takes a smaller value than a maximum value of a mechanical rotation angle of the medium. This relationship is decided from the refractive index of the medium as will be described later. Formulating the conditions, denoting one side of the memory cell in the x-direction and a minimum space by $D_x$, $S_x$, respectively, and denoting counterparts in the y-direction by $D_y$, $S_y$, respectively, the formula becomes $$S_x/D_y > \tan(\theta_{im}) \quad (1.1)$$

$$(S_x+D_x)/(S_y+D_y) < \tan(\theta_{im}) \quad (1.2).$$

Incidentally, although when notating an angle, the angle is often represented with a sign in order to show its rotation direction, the angle in the above formula uses its size, i.e., the absolute value to convert the angle to a positive value. It should be noted that since the sign becomes complicated also in the formula that will be explained below, an explanation of existence/absence of the sign may be omitted.

Here, a denominator of the left-hand side of Formula (1.2) is the minimum pitch $P_y$ in the y-direction of the dot DOT, and a numerator is the minimum pitch $P_x$ in the x-direction of the dot DOT. Suppose that the dot DOT is a cube (its cross section is a square) and the minimum space in the x-direction is equal to the lengths of the sides of the dot DOT, $D_x=D_y=S_x$ holds, and therefore the left-hand side of Formula (1.1) becomes unity. Taking fused silica as an example, since $\theta_{im}$ is equal to or less than 45°, as will be described later, the right-hand side of the formula becomes unity or less, and this formula is satisfied. Therefore, $$P_x/P_y=2D/(S_y+D)<\tan(\theta_m) \quad (1.3)$$

becomes a condition from Formula (1.2). Here, D is one side of a square dot DOT, and is also a minimum space in the x-direction. Letting $\theta_a$ denote an angle that incident light in the air and a normal of the incidence plane of the sample (i.e., the y-axis) make, i.e., the mechanical rotation angle $\theta_i$ satisfies the Snell's law $$n=\sin(\theta_a)/\sin(\theta_i) \quad (1.4)$$

using $\theta_a$ and a refractive index n of the medium.

Since the $\theta_a$ is an angle that the incident light in the air and the normal of the incidence plane of a sample make, when the medium is tabular, its maximum is 90°, and the $\theta_i$ at that time is a maximum $\theta_{im}$ of $\theta_i$. This is equivalent to a condition of total reflection in the case where the light is emitted into the air from the interior of the medium.

For example, assuming that the medium is synthetic fused silica and setting its refractive index to 1.465 (light wavelength: 457.9 nm), the calculation gives $\theta_{im}$ of about 41°. Thus, $\theta_{im}$ can be decided. However, since when $\theta_a$ becomes close to 90°, the transmittance becomes low due to surface reflection, a practical maximum value of $\theta_a$ becomes smaller than 90°, and $\theta_{im}$ also becomes smaller than the above value in accordance with it.

For example, setting the maximum value of $\theta_a$ to 60° will result in $\theta_{im}=36°$. Since setting $\theta_{im}$ to 36°, its tangent is 0.73, it is desirable that a ratio $P_x/P_y$ of the minimum pitches of the dot be 0.73 or less practically, in other words, $P_y$ be set to 1.36 times of $P_x$ or more when Formula (1.3) is used. Moreover, it is also found that desirably the minimum space Sy of the dot in the y-direction is set to 1.73 times or more of one side D of the dot DOT.

Although in the above, a sectional shape of the dot DOT is set to be a square for simplicity, and the gap in the x-direction $S_x$ and a width D of the dot DOT are made equal, even if the cross-section of the dot DOT is rectangle or even if the size and the space of the dot DOT are different, a desirable pitch is calculable from the formula shown above. A dot DOT whose cross section is a rectangle, especially one whose side in the depth direction is short has a merit of lessening the possibility that the intensity of the transmitted light become too weak because reduction ratio of the transmitted light is small even if the dots DOT of '1' increase in number. Moreover, since the quantity of the light that enters from the side face of the dot DOT is small when rotating the medium, there is a merit of decreasing the possibility that the light entered the side face of the dot DOT, and its scattered light becomes noise, which causes a detrimental influence on reproduction of the cross-sectional image. In addition, even if the shape of the dot DOT is another shape, such as a circle, it is easy to calculate the cross-sectional image based on the similar idea.

Incidentally, it was described that when $\theta_a$ became close to 90° in the above, reflection became large. This is based on the following reasons. When the light enters an interface of materials each having a different refractive index at a certain angle, a polarization component whose electric field is parallel to the incidence plane (P-polarization) and a polarization component whose electric filed is perpendicular to it (S-polarization) have different reflectances, respectively. A reflectance decreases as the angle becomes larger in the P-polarization, decreases to zero at an angle called Brewster's angle (an angle at which reflectance of the P-polarization component of an electromagnetic wave on a plane of the memory medium becomes zero), and increases as the angle becomes larger beyond that angle. On the other hand, the S polarization shows a monotonous increase. Therefore, with normal lighting in which the P polarization and the S polarization are mixed, at $\theta_a$ exceeding the Brewster's angle, the reflectance is large; it is difficult to obtain transmitted light of a practical intensity. In the case, the Brewster's angle is calculable from the refractive indices of the medium and the air. Although it depends on the medium, many of the Brewster's angles will be about 60°.

For the above-mentioned reasons, in a usual lighting where the P polarization and the S polarization are mixed, it is recommendable to set a maximum rotation angle to between the Brewster's angle and 90°.

Incidentally, a practical range differs depending on a ratio of the P polarization and the S polarization, what is necessary is just to decide an optimal angle according to a property of an optical system including the lighting and a filter.

Figure 2:
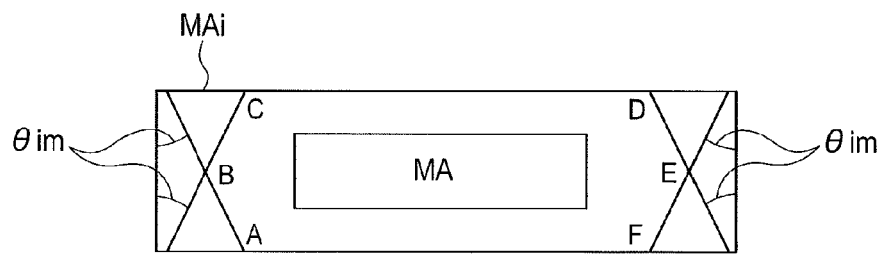
FIG. 2 is an embodiment showing an area in which the data can be stored in tabular memory medium in the present invention.

Next, a range of the memory area MA at the time of using the tabular memory medium will be explained. FIG. 2 is a sectional view of the medium shown in FIG. 1A. It is required to decide a memory area of the data so as to be within a hexagonal area shown in this figure. The reason will be explained below.

As described above, an upper limit $\theta_{lm}$ exists in the angle of the light that falls on the record dot DOT in the interior of the medium. Therefore, it is necessary to record dots within the area on which the light falls in the range within $\pm\theta_{lm}$. When light is entered from the front of and to the back of a tabular medium, a portion surrounded by points A, B, C, D, E, and F in FIG. 2 is a range that can be used for recording of the dot. When the memory cell is placed so as to be within this area, for example, in the interior of the MA shown in FIG. 2, the light falls on the memory cell at every rotation angle, and therefore reliability of the reading of the data by the computer tomography can be increased.

Incidentally, when the memory medium MM is preserved for a long time, it is considerable that a surface and its neighborhood of the medium may suffer from corrosion or mechanical damage. In such a case, in order to protect the recorded data, it is recommendable to provide the memory area MA at some depth from all the surfaces of the memory medium MM within a range of the limitation. If it is configured in such a manner, even if damage occurs near the surface, the recorded data can be read by polishing the surface again.

Moreover, if an alignment mark for serving as a guide of a position is written in the memory medium, it will be convenient. Furthermore, if a plurality of alignment marks like this alignment mark are recorded at suitable positions of the memory medium not only as the reference point of coordinates but also as reference points of the rotation and a reference of density of the data, corrections will be able to be performed, for example, for the aberration of the optical system, a profile error of the medium, a dispersion in the writing of the density of the dots resulting from positions of the medium, a dispersion of the reading, etc.; therefore, storage and reading of information with a higher reliability will become possible. Incidentally, the alignment mark maybe recorded within the area shown in FIG. 1C and is read from a plurality of projection images acquired during rotation. In the case of an alignment mark that is used to determine whether the incidence plane of the light and the light make a specific angle, for example, 0°, i.e., the two become perpendicular to each other, since what is necessary is just that the mark can be seen in the projection image of the angle 0°, it is possible to write the mark outside the data recording range of FIG. 1C. In that case, since a record area of the data is not used, there is a merit that storage capacity can be secured greatly by that amount.

Next, modes of expression of digital data will be described using FIG. 3 and FIG. 4. Incidentally, as will be clear from an explanation described latter, these modes of expression have a merit for the memory medium of other shapes, such as a cylinder and a polygonal pillar, other than the tabular medium as in FIG. 1 and FIG. 2. Explanation will be given taking the tabular medium as an example, below.

As described above, in the embodiment of FIG. 1, a short-time pulse laser light, such as of the femtosecond laser, is focused on the memory cell in which a bit '1' is intended to be written using a lens, and that portion is made to cause the modification, such as a change of the refractive index, etc. In an area that is expected to be bit '0,' the laser is not made to fall on it without causing the modification, and the area is kept as it is. Therefore, recording of the data takes longer as a ratio of '1' contained in the digital data to be stored is larger.

Moreover, the intensity of light that passes is observed in the reading by the computer tomography. Therefore, when many '1s' exist on an optical path, the intensity of the light becomes smaller exponentially to the number, consequently the data becomes susceptible to an influence of noise, and the reliability of the read data may fall in some cases. Especially, in the case where the number of memory cells in the depth direction is intended to be increased, such a possibility becomes high. Even in such a case, a relatively smaller number of '1s' is better.

FIG. 3 is an embodiment in which a usual binary number of an 8-bit length is converted into a format of 9-bits whose number of '1s' is small. Whereas in the usual binary number of 8-bit length, the number of '1s' is eight at the maximum, in the format shown in a right most row of FIG. 3, it shows only four at the maximum. For this reason, if data conversion is performed using the embodiment of FIG. 3 and the data is recorded on the memory medium, it will be possible not only to manufacture the memory medium in a shorter time but also to increase the reliability of the reading. Moreover, there is a case where it becomes possible to increase the storage capacity by increasing the number of memory cells in the depth direction within a range that allows the intensity of the transmitted light.

The format will be explained using FIG. 3. FIG. 3 shows a decimal number, a binary number of a normal 8-bit length, and a 9-bit format of this embodiment that has a smaller number of '1s' from the leftmost. This format is a 9-bit length and the number of '1s' is four at the maximum, and therefore this is called a 4/9-bit format. Since in a bit row of '0' and '1' of the n-bit length, an expression where the number of '1s' is k is $_nC_k$ (here, C is a combination), and in the case where n is set to 9 and k is set to 4, a sum total of $_9C_0$, $_9C_1$, $_9C_2$, $_9C_3$, and $_9C_4$ becomes 256. Therefore, all the binary numbers of 8-bits will be able to be expressed using an expression of 9-bits length assuming that the maximum number of '1s' is four. Regarding correspondence between the normal binary number and this expression, various correspondences are possible. In the 4/9-bit format of FIG. 3, the correspondence is specified such that the number of '1s' is increased gradually as the corresponding normal binary moves from a small number to a large number.

Moreover, when the same number of '1s' appears, the numbers are aligned so as to be in the order of size when it is seen as a binary number. This correspondence is for making the conversion between a given binary and corresponding format easy to understand, and it is natural that how to associate the both numbers is not limited to this and may be modified in various points according to its purpose. Here, since the data is generally constructed using 8-bits, i.e., using 1-byte as a unit, the example where a binary number of 8-bits is converted is shown. Moreover, in order to lessen a bit number for conversion, the embodiment where the data is converted into 9-bits is shown. However, it is natural that if a binary number of an arbitrary bit length is replaced with an expression whose bit length is longer than that, the number of '1s' can be decreased, and it is recommendable to optimally set the bit length according the data that is intended to be recorded. According to the method as in FIG. 3, the number of '1s' can be decreased much as the bit length of the format to be converted is made longer than that of the original data. Moreover, although in the above, the number of '1s' was not limited to 4 but codes of 3, 2, 1, and 0 were also used, a case where the number of '1s' is set to a fixed number and a probability of an error at the time of the reading is expected to become lower can be considered. As an example of such a case, for example, a code such that the number of '1s' is decided to be four using the 144-bit length is considerable. In this case, since $_{144}C_4$ is larger than the 24th power of 2, it can express the binary number of 24-bits. Besides, various codes can be used by the same principle. What is necessary is just to select a code considering the thickness of the medium, the pitch of the memory bit, transmittance permitted, etc.

FIG. 4 shows an embodiment that is of different format from that in FIG. 3. This is an example where a binary number of 8-bits is set to a 20-bit length and a maximum of the number of '1s' is set to 5. Comparing this with the format of FIG. 3, although it is inefficient in reduction of '1s,' there is a merit that interconversion with a binary number is intelligible. This format is configured so that a binary number that expresses the number of '0s' being continuously in sequence from the right end in the code of a 20-bit length may correspond to the lower 4 bits of a corresponding binary number, and four bits existing on the left side of '1' that exists on the rightmost side (portion shown by Italics underlined) may become higher 4 bits of a corresponding binary number. In this format, the format can be converted to a binary number only by counting the number of '0s' on the right-hand side and copying four bits that is on the left of '1' as it is.

Although variations can be variously considered for the format based on the idea of decreasing the number of '1s' by using the format of the bit length longer than the bit length of the original binary number besides those of FIG. 3 and FIG. 4, what is necessary is just to select a format in consideration of a margin of the memory area, a record time permitted, ease of conversion, etc.

Figure 5:
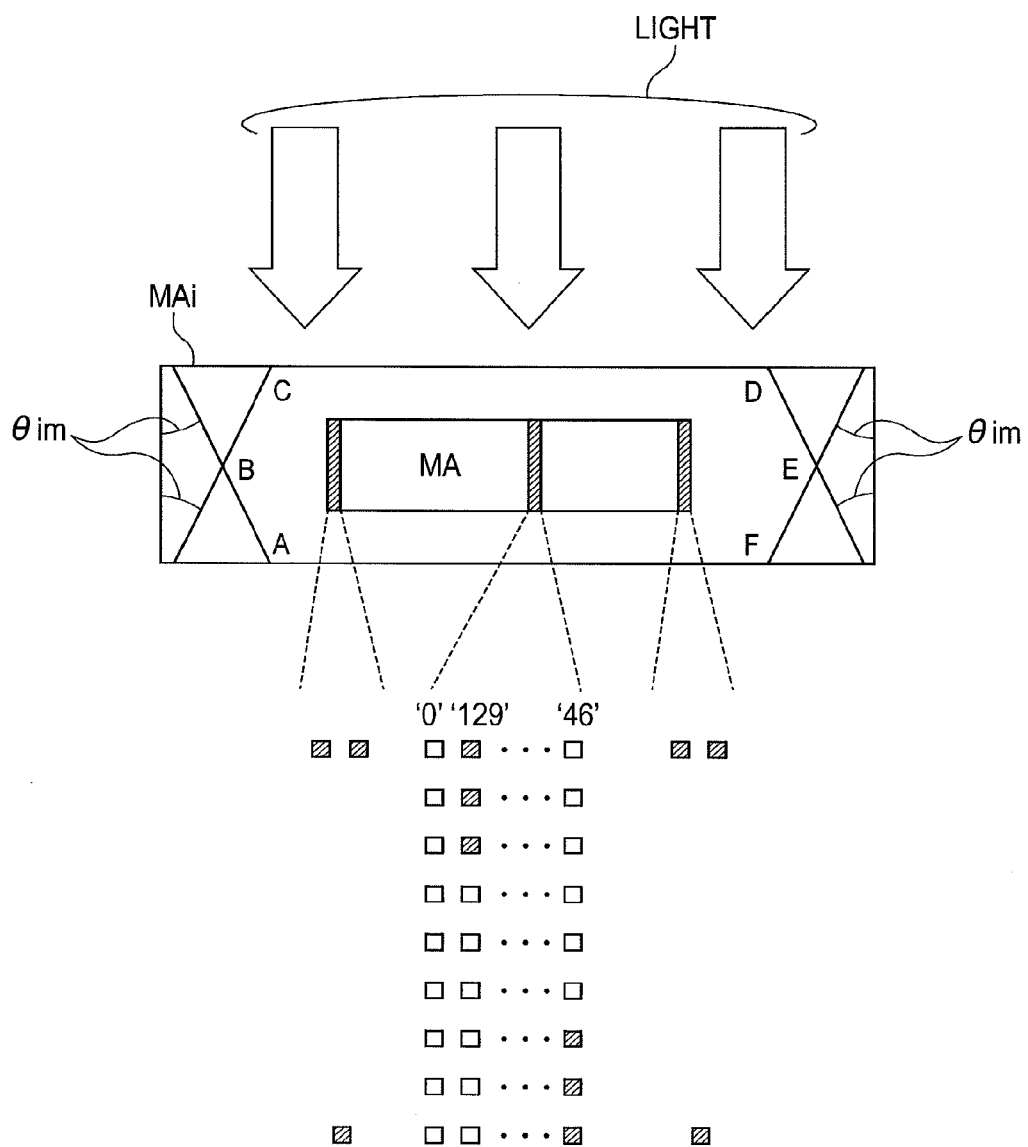
FIG. 5 is a diagram showing one example of a method for arranging the data using the embodiments of FIGS. 1 to 4.

Next, a concrete embodiment in which the data is recorded in the embodiment of FIG. 1 using the format of FIG. 3 is shown. FIG. 5 shows an embodiment showing how the dot is recorded in a cross-section as in FIG. 2 in the tabular memory medium. The figure shows a situation where numbers corresponding to 0, 129, and 46 in decimal number are recorded in the depth direction of the medium with the 4/9-bit format shown in FIG. 3. A black square represents a minute area of a bit '1' that was modified by a laser and a white square represents a minute area of a bit '0' that was not modified. Following the embodiment of FIG. 2, the pitch in the depth direction (a longitudinal direction on drawing sheet) is enlarged. Recording the data as in the embodiment shown in FIG. 5 makes it possible not only to obtain high reliability when using the tabular medium but also to shorten the record time.

Figure 6:
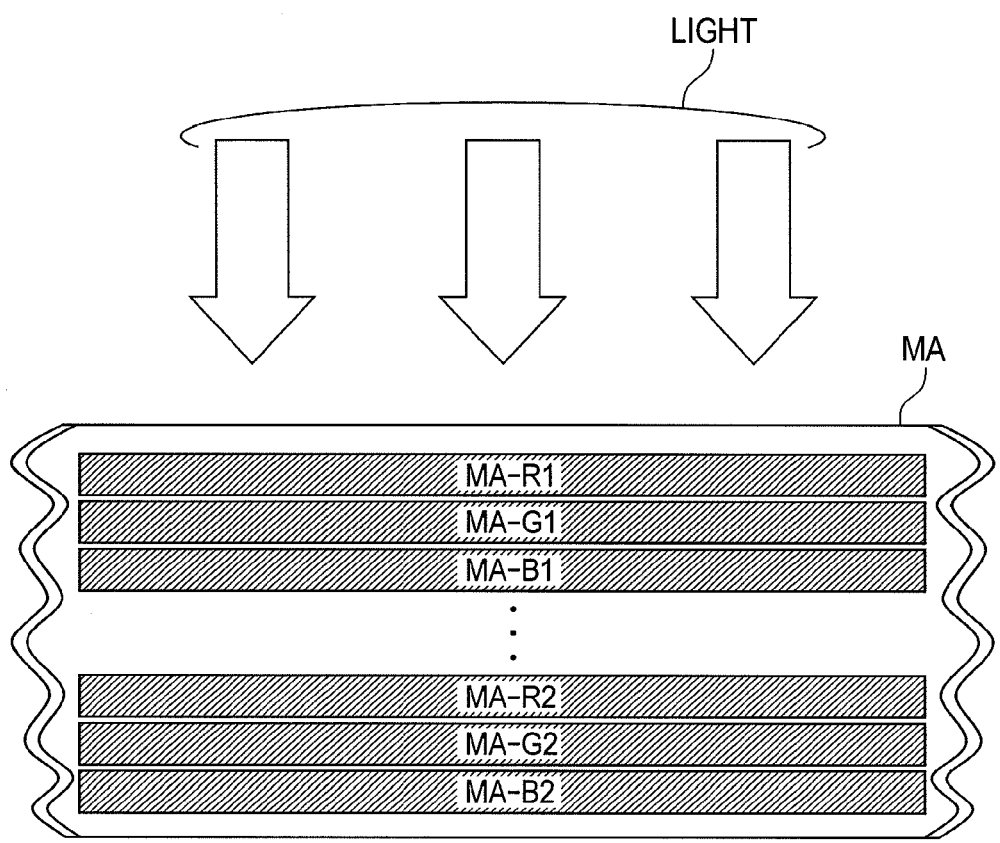
FIG. 6 is a diagram showing another one example of a method for arranging the data using the embodiments of FIGS. 1 to 4.

FIG. 6 is an embodiment that is suitable for recording the data of a color image using the embodiments from FIGS. 1 to 3 (or FIGS. 1 to 4). FIG. 6 shows a situation where a plurality of pieces of photograph data whose color was separated into red (R), green (G), and blue (B) are recorded in the internal of planar memory medium. Doing in this way makes it possible to record the data of plural color images in the tabular memory medium.

For example, if non-compressed data of RGB colors is recorded using the 4/9-bit format of FIG. 3, it will be possible to record a color image with 8-bit gradations in the respective RGB colors, i.e., in so-called full colors. In the case where images are preserved for an extremely long time, a method like this has a merit that even if a part of the data becomes unreadable in the future, a portion of the image other than this can be reproduced.

It is needless to say that compressed data can be recorded using the embodiments so far described. In that case, it is natural that much more images can be recorded, and needless to say that the method is effective in recording all kinds of digital data other than images. Incidentally, when using the format as in FIG. 3 and FIG. 4, it is desirable that its conversion rules are converted into text data or an image of a table and is preserved simultaneously with the data as a kind of metadata. Doing in this way makes it possible to avoid a situation where it is impossible to decipher the recorded data in the format in the future. Since the format as in FIG. 3 and FIG. 4 is extremely simple, it gives a large merit that metadata can be recorded using a small number of areas.

Figure 7:
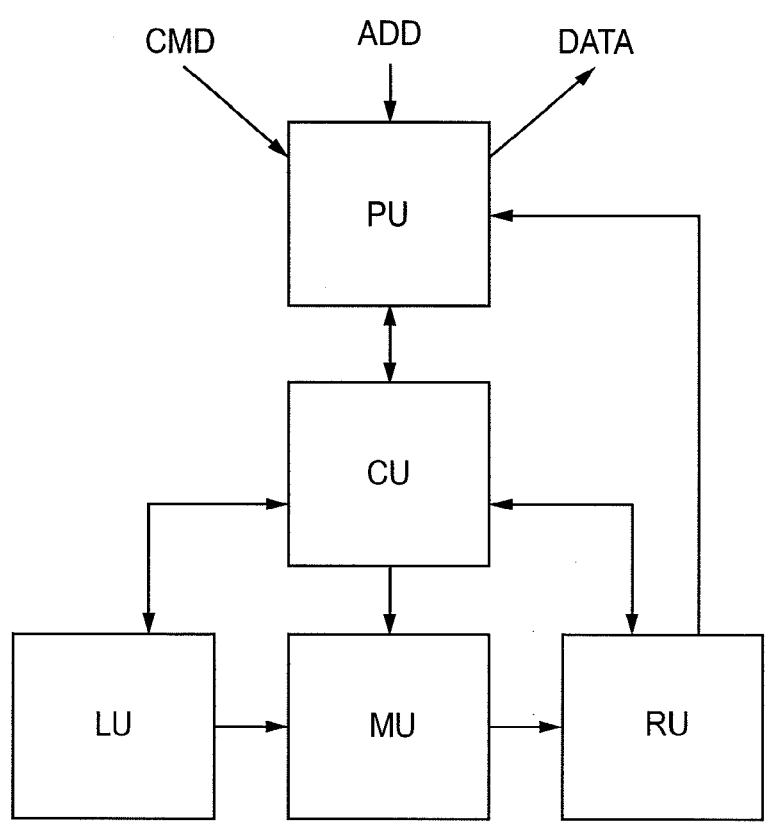
FIG. 7 is a block diagram showing one example of a configuration of an information storage device of the present invention.
Figure 8A:
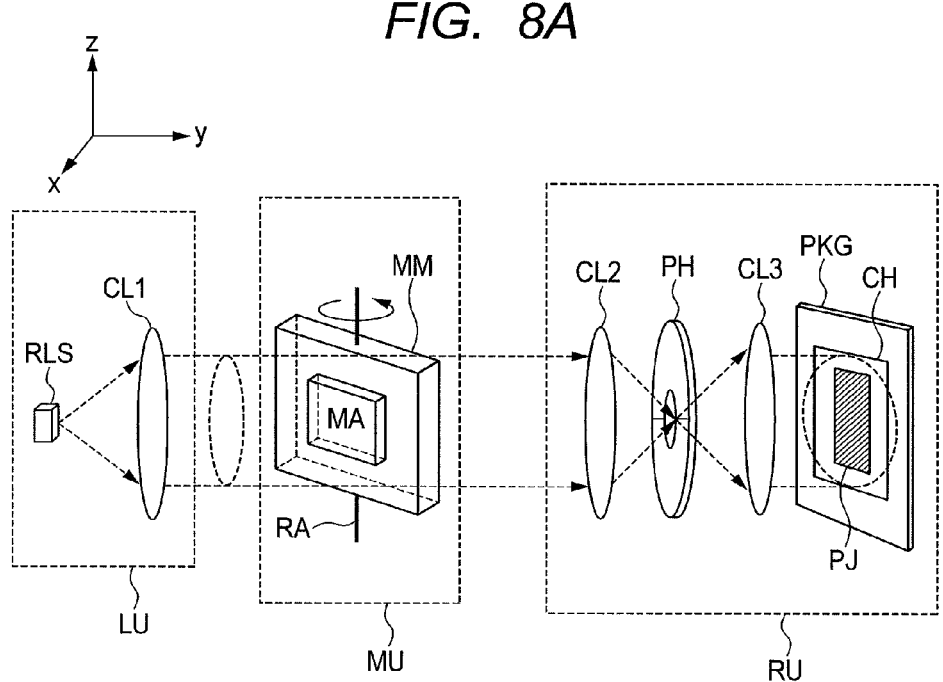
FIG. 8A is a diagram showing a perspective diagram of main constituents of FIG. 7.
Figure 8B:
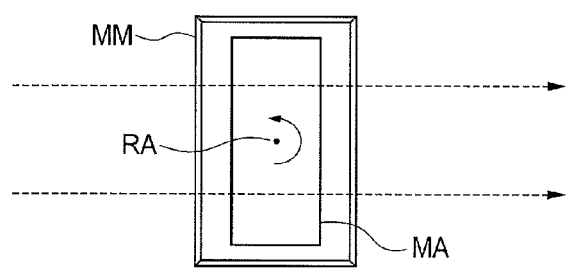
FIG. 8B is a diagram showing a top view of a memory medium MM and a memory area MA.

FIG. 7 and FIGS. 8A and 8B are diagrams showing one example of a configuration of an information storage device of the present invention. In these embodiments, the projection images are taken by making the parallel rays fall on the medium while it is being rotated little by little, and the recorded information of the memory cell is read using an arithmetic operation of the computer tomography. FIG. 7 shows a block diagram showing main components (hereinafter referred to as a unit) in this embodiment, and FIG. 8A shows a perspective diagram of a concrete configuration example. Incidentally, the y-axis in FIG. 8A is an axis that goes from a lighting unit LU toward a receiving unit RU, and an x-axis is an axis perpendicular to the drawing sheet. Hereafter, this setting is the same as long as there is no special notice.

In FIG. 7, MU is a memory unit and is constructed including the memory medium MM of the embodiment described above. LU is the lighting unit and RU is the receiving unit. Light is irradiated onto the memory unit MU by the lighting unit, and the projection images required for the arithmetic operation of the computer tomography are taken by the receiving unit RU. CU is a control unit and controls rotation, up-and-down movement, etc. of the memory medium in the MU. PU is an arithmetic unit, performs a signal processing on the data of the projection image given from the receiving unit RU based on a principle of the computer tomography, and calculates arrangements (addresses) and their values of the memory cells recorded in the memory unit MU. Moreover, in the case where recording is performed by the mode of expression shown in FIG. 3 or FIG. 4, the data may be outputted after the data is converted into 8-bits by performing code conversion in an arithmetic unit PU. Thereby, an interface connected with an external processor etc. can be constructed with a commonly used bit width, such as 8-bits and 16-bits.

In this embodiment, when a three-dimensional address range ADD and a command CMD are inputted into the arithmetic unit PU from the outside, the control unit CU will control the lighting unit LU, the memory unit MU, and the receiving unit RU. Thereby, the receiving unit RU takes a plurality of projection images, as will be described later, finds a value of the data inside the memory unit MU that corresponds to the inputted address range according to the principle of the computer tomography, and outputs it. Arrows shown in this block diagram show flows of the data among the blocks, control signals, etc.

FIG. 8A is an embodiment showing a perspective diagram of main constituents of FIG. 7. In this embodiment, although the principle of the computer tomography is applied to the reading of data, not X-rays used by tomography of a human body, etc. but ultraviolet light and safe light that has a longer wavelength than it are used. For this reason, a special safety measure of providing shielding means of an X-ray in an installation site is unnecessary, and it is possible to put it easily in places where a large number of people use it, for example, a government office, a library, an art museum, or the like.

Below, a configuration and an operation of the embodiment shown in FIGS. 8A and 8B will be explained. In this embodiment, light of lighting is irradiated from a pinhole and is converted into the parallel rays by a collimation lens CL1. A distance between the pinhole and the collimation lens CL1 is made equal to a focal length of the lens CL1. On the other hand, the memory medium MM is a tabular sample made for trial purposes using the above-mentioned embodiment, and the data is written in a plurality of internal minute areas.

The parallel rays irradiated from the collimation lens CL1 enter the memory medium MM. The light that is transmitted through the interior of the memory medium MM as the parallel rays is inputted into an imaging chip CH after passing again through a second collimation lens CL2, a pinhole PH, and a third collimation lens CL3. Functions of the collimation lenses CL1 and CL2 and the pinhole PH are to increase the SN ratio of the projection image by cutting both light that is scattered by minute modified areas being stored inside when the parallel rays are transmitted inside the memory medium MM and stray light resulting from surface reflection of lenses and members constituting the optical system. It is recommendable that a distance between the collimation lens CL2 and the pinhole PH is made equal to a focal length f2 of the collimation lens CL2, and a distance between the pinhole PH and the collimation lens CL3 is made equal to a focal length f3 of the collimation lens CL3. If doing in this way, since only the parallel rays among light rays that are made to enter the collimation lens CL2 can pass through the pinhole PH, the projection image by the parallel rays can be taken with a high SN ratio.

Moreover, since the light passing through the pinhole PH returns to the parallel rays by the collimation lens CL3, even if a distance between the imaging chip CH and the collimation lens CL3 is changed, magnification of the image does not change. In addition, since the image that is transmitted through the correction lens CRL2 is projected onto the imaging chip being magnified by f3/f2 times, a desired magnification can be obtained by varying a ratio of Ff2 and f3. Moreover, since the light that is transmitted through the CL3 is the parallel rays, placing an interference filter in front of the imaging chip CH and limiting the wavelengths passing through it can be done easily. As is well known, if the light is given to the interference filter obliquely, the transmission wavelength will shift from a design value. However, since the light is the parallel rays here, it is possible to obtain a spectrum of the transmitted light whose wavelength agrees well with the design value of the interference filter. Thereby, an image can be taken only with light color light of a desired wavelength, and it is possible to remove an influence of chromatic aberration easily. Incidentally, it is natural that in the case where a monochromatic light source can be used or the filter can be provided on a light source side, the projection image may be taken by omitting the collimation lens CL3 and placing a camera lens etc. in front of the imaging chip CH.

In any case, it is needless to say that the embodiment is effective in removing the scattered light and extracting the parallel rays that are transmitted through the medium, and there is also a merit that the adjustment of the device is easy because the light becomes the parallel rays between the collimation lenses CL1 and CL2 and consequently distortion of the image is hard to occur with respect to a displacement of a lens group collectively consisting of correction lenses CRL1, CRL2 and the memory medium MM (a displacement in a direction parallel to the light or in a direction perpendicular thereto). There may be a case where limitation of the transmitted light wavelength using the filter decreases the quantity of light and increases an imaging time. In such a case, it is effective that an achromat lens, an apochromatic lens, or the like each of whose chromatic aberrations is corrected is used as the collimation lens CL, and then the filter whose range of transmission wavelengths is large or no filter is used. Since generally, such a lens is corrected not only in chromatic aberration but also in other aberrations, such as spherical aberration, it is expectable to obtain a clearer projection image with it. It is natural that a lens of an aspheric surface may be used if needed, and a lens system consisting of a plurality of lenses may be used.

In FIG. 8A described above, in order to read the data recorded in the memory medium MM, the projection images are taken while rotating the memory medium MM little by little around a rotation axis RA. In this way, the projection images needed for the arithmetic operation of the computer tomography are collected so that angles of the transmitted light rays may be included in a rage of $\pm\theta_{im}$. If these data can be obtained, it will be possible to calculate the sectional shape of the memory medium, i.e., the distribution of memory cells, in the arithmetic unit PU by the principle of the computer tomography.

The projection image by the parallel rays can be taken in this embodiment. For this reason, there is a merit that the amount of the arithmetic operation is small as compared with the case where the projection image is obtained by a fan beam of an X-ray. Details of the arithmetic operations of the computer tomography by the parallel rays and of the computer tomography by an X-ray fan beam are described in "Digital Picture Processing," Second Edition, Volume 1, Ariel Rosenfeld, and Avinash C. Kak, Academic Press Inc., Section 8, pp. 353~430.

As the light source of lighting, an LED light source etc. can be used. The LED light source has merits that generation of heat is small and power consumption is small. It is natural that when light of a specific wavelength is intended to be taken out of the light of LED, it is natural that what is necessary is just to use the filter as described above. Incidentally, when the quantity of light runs short in the LED light source, a xenon lamp, a mercury lamp, etc. maybe appropriately applied to the light source. In order to discriminate the transmittance of the light of the minute area with a small pitch, it is desirable to prevent deterioration of the image by interference of light from being generated.

For this reason, as the light source of lighting, one that is not strong in coherency, in other words, one whose coherence length is short is desirable.

Moreover, although light shielding cover and cloth for cutting extra light that enters the device from the outside are omitted and the diagrams are drawn in this embodiment and an embodiment that will be described below, it is natural that means for shielding light is used, and a measure for preventing extra light from coming in, such as making the whole room in which a device of the embodiment is installed be a dark room, are adopted. Furthermore, as described above, since a relationship between the reflectance and the rotation angle varies depending on a polarization component, a ratio of the polarization component may be adjusted according to the angle after putting a polarizing filter in the optical path.

Since the projection image of the memory area MA is specified to be within the imaging chip in this embodiment, it is also unnecessary to move the memory medium MM up and down. This configuration is good because a configuration of the control unit can be simplified in the case of small-size memory medium. It is natural that when using a memory area that is long in the RA-axis (z-direction) as the MA, what is necessary is jut to move the memory medium in the RA-axis direction. Here, since pixels that are arranged two-dimensionally are used as the imaging chip, the amount of movement for one time may be such an amount of movement by which one projection image is moved to be within the imaging chip in the z-direction.

Incidentally, in FIGS. 7 and 8, a point light source was used as an RLS, and the light from it was made to enter the circular collimation lens CL to obtain the parallel rays. Moreover, the projection image of the MA by the light was imaged by the two-dimensional imaging chip CH. However, the present invention is not limited to this scheme. For example, in the case where cost is more prioritized than the reading time, it is all right that the memory medium is imaged using a lens being thin in a z-axis direction and an imaging chip of a one-dimensional line sensor type while the medium is being moved along the RA-axis each time it is rotated one time. Moreover, it is also possible to form the parallel rays by using a slit light source prolonged in the z-direction as the RLS and using a cylindrical lens prolonged in the z-direction as the collimation lens CL. When the parallel rays that are long in the z-direction are required, this method may do with a reduced cost than the case of using a circular large-size lens.

Moreover, in the embodiment, since the projection image of the whole memory area MA is within the imager, acquisition of one set of projection images that are taken with varying angles makes it possible to calculate the cross section at arbitral z in the MA. However, depending on the case, only distribution information of the memory cells at a part of z in the MA may be required. In such a case, it is natural that what is necessary is to preserve only the data such that light is transmitted through an area for which the data is required among the data of projection images acquired during rotation at all the z-values.

In the above, the embodiment of the information storage device capable of reading the data arranged three-dimensionally in the memory medium was explained using FIG. 7 and FIGS. 8A and 8B. According to this, it is possible to reproduce the three-dimensional data at high speed only by taking projection images while rotating the memory medium MM. Since the data is recorded three-dimensionally, it becomes possible to produce the information storage device of a large capacity without using a miniaturization technology as compared with the memory medium that records the data two-dimensionally or in a small number of layers. Moreover, the data can be written in or read from a solid body three-dimensionally without using complicated wiring and a manufacturing process that are used for the semiconductor memory.

Moreover, since it is not necessary to rotate the medium at high speed, the drive device can be simplified compared with the hard disk and the optical disk, and its power consumption can be reduced. Furthermore, since the reading of the data is performed from a side face of the memory medium, it is possible to increase the height of the memory medium, i.e., the number of layers, without causing deterioration of the SN ratio that is produced when the number of layers is increased in JP-A-H11 (1999)-337756.

Moreover, since the width of the parallel rays in the x-direction is equal to or more than the size of the memory area MA in the x-direction, this devise is also free of the problem that the projection images acquired during rotation are difficult to obtain like JP-A-H06 (1994)-076374. Incidentally, in this embodiment, when rotating the memory medium little by little to the parallel rays, transmission of the parallel rays through the slanted plate causes the angle of the light to vary inside the memory medium due to an influence of refraction. That is, although the light is the parallel rays also in the inside, light passes through the memory area at the rotation angle (an angle smaller than the above-mentioned $\theta_a$, i.e., the above-mentioned $\theta_t$) of the medium.

Moreover, the size in a direction perpendicular to the light varies. Since these changes of the angle and size can be easily calculated from the refractive index and rotation angle of the medium, what is necessary is to correct the rotation angle of the projection image from a physical rotation angle, correct the size, and calculate the cross-sectional image. Incidentally, the light returns to the parallel rays in the same direction as that of the incident light. However, because of an influence of variation of the angle inside, the image is slightly displaced in a direction perpendicular to the light. Since this quantity is also calculable from the refractive index, the thickness, and the rotation angle of the memory medium, position displacement of the projection image can be corrected by calculation, and if a mark serving as a signpost is put in the memory medium, it is possible to easily perform alignment of a plurality of projection images that were imaged based on that mark.

Second Embodiment

A second embodiment showing a configuration of the present invention will be explained using FIG. 9 and FIG. 10. This embodiment is characterized by being also equipped with a write function in contrast to a fact that the embodiment explained in FIG. 7 and FIGS. 8A and 8B is for reading only. Taking the existing optical disk as an example, the first embodiment is a device for playback only. In contrast to this, in the second embodiment, a playback and recording device that enables the writing of data and enables a personal user to perform the recording can be constructed.

Figure 9:
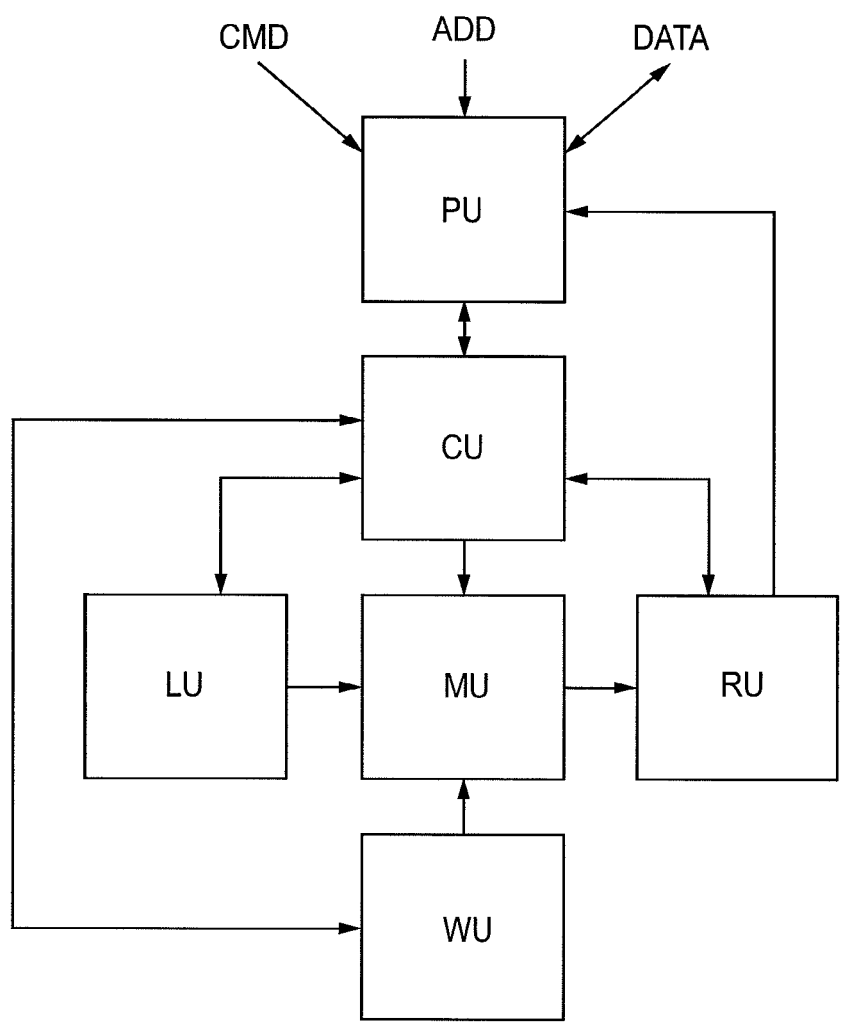
FIG. 9 is a block diagram showing another one example of a configuration of the information storage device of the present invention.
Figure 10:
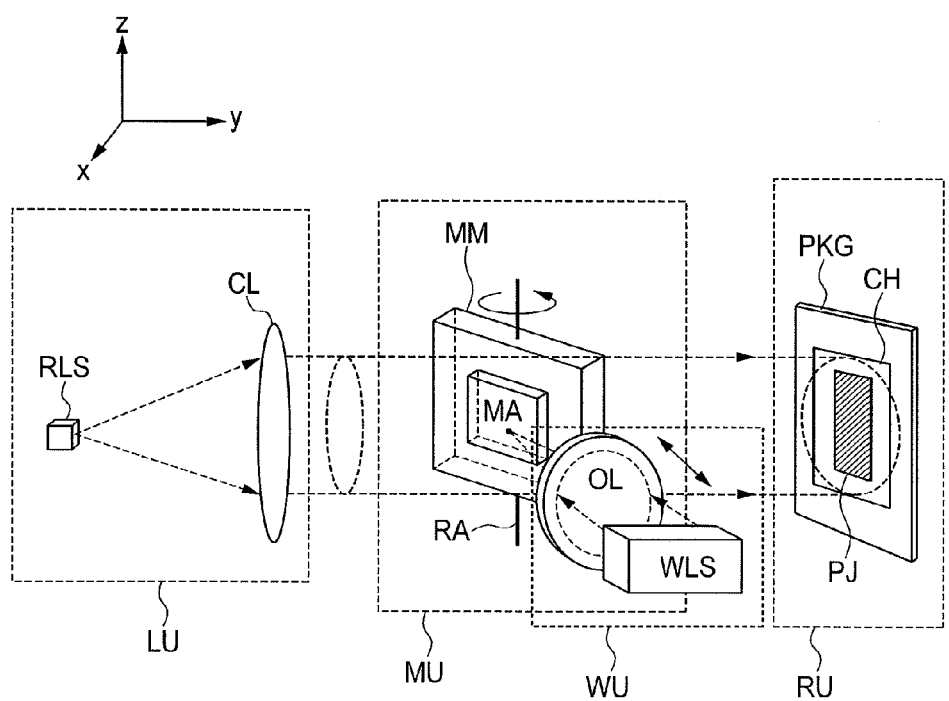
FIG. 10 is a diagram showing a perspective diagram of the main constituents of FIG. 9.

FIG. 9 shows a block diagram showing a main unit in this embodiment, and FIG. 10 shows a perspective diagram of a specific configuration. As is clear from a comparison between FIG. 9 and FIG. 7, this embodiment is the embodiment of FIG. 7 with a writing unit WU added. The writing unit WU is for writing the data in the memory unit MU.

Its specific operation will be explained using FIG. 10. Incidentally, since a reading operation is the same as that of the embodiment explained in FIG. 7 and FIGS. 8A and 8B, it is omitted and only a writing operation will be mentioned. In FIG. 10, WLS denotes a writing light source and OL denotes an objective lens. These constitute the writing unit WU in the block diagram of FIG. 9. First, the tabular memory medium MM is rotated so that one of two parallel planes thereof may confront the writing light source WLS and the objective lens. In this state, if the light is radiated from the WLS, it will be focused by the objective lens OL, come into a focus in the interior of the memory area MA, and cause the thermal modification to the minute area corresponding to the focus. Data is written by this.

In order to select the minute area arranged three-dimensionally, the focus can be moved in a direction that connects centers of the light source WLS and the objective lens OL, namely the depth direction of the memory medium MM by moving back and forth the objective lens OL to the writing light source WLS. Furthermore, if fixing of the angle of the memory medium MM and two-dimensional movement are combined, it is possible to make the focus of the light at a desired position inside the memory area MA and to cause the thermal modification in its vicinity. Although a shift device for performing rotation and two-dimensional movement is omitted in the drawing, it can be easily implemented by a combination of precise fine adjustments, such as a pulse motor and a micrometer. Incidentally, these controls are performed by the control unit CU in accordance with the command CMD, address ADD, and data DATA inputted from the outside. Moreover, when storing the data by the mode of expression shown in FIG. 3 or FIG. 4, it is recommendable that the data is written into the arithmetic unit PU after the data to be inputted thereinto is subjected to cord conversion in the arithmetic unit PU specifying 8-bits as a unit. Thereby, the interface connected with an external processor etc. can be constructed with commonly used bit-width, such as 8-bits and 16-bits.

As the writing light source WLS, lasers, especially short pulse lasers, such as the femtosecond laser, are suitable. In the case where the writing is performed with a short-time exposure by focusing light of such a laser, it is possible to cause the thermal modification locally in the minute area, which makes possible higher-density recording of data. In the minute area suffered from the thermal modification, strains and changes of the layer remain, a change of the refractive index occurs locally, and a difference from the surroundings in scattering characteristics of the light to the transmitted light or in absorption characteristics occurs. Therefore, it becomes possible to record digital information, for example, by regarding a site where the modification arises and a site where it does not as '1' and '0,' respectively, recording of the digital information becomes possible. Incidentally, a case where when writing the data, if there is an area that has already suffered from the thermal modification in a path of the writing light, the writing cannot be performed sufficiently because of a reduced intensity of the light etc. is considerable. In that case, the problem can be solved either by selecting a lens whose viewing angle of the objective lens from a focal position is wide, i.e., a lens with a larger NA or by performing the writing of data from a position far from the objective lens toward the front.

This embodiment has a read function together with a write function. If this is used, it will be possible to check the writing variously. For example, when the thermal modification for the writing is not sufficient by checking the write data with the read function after the writing of data, it is possible to write the data again. Moreover, it is possible to verify a displacement between the coordinates at the time of the writing and the coordinates at the time of the reading in advance by performing marking of positioning at a site other than the memory area MA and reading it. By the arithmetic unit PU performing the arithmetic operation based on this verification result, it becomes possible to avoid malfunction caused by an influence of aberrations of the collimation lens CL for reading and the objective lens OL for writing, for example, a distortion, etc.

In the above, the embodiment that used the tabular medium as the memory medium and used the light to read the data was described. The use of lighting whose wavelength is in a range from visible light to infrared light and whose intensity is weak for the reading as in the embodiments has merits that there is no fear of deterioration of the memory medium and storage data, which is different from the X-ray computer tomography, and that correction of various optical paths is possible using a normal lens. If the embodiments described in FIG. 1A, FIG. 1B, FIG. 1C, and FIG. 2 are applied, such a merit is utilizable for the memory medium of the tabular shape that is easy to handle. Incidentally, the present invention can be implemented using not only such a wavelength but also a wavelength in a region that is categorized in so-called electric waves.

Below, an embodiment that applies magnetic resonance using an electric wave of a frequency band called radio wave will be described. In this embodiment, since despite a long wavelength, a resonant frequency is used, this gives a merit that spatial resolution can be increased higher than a level limited by the wavelength, and also makes it possible to use metal that is more resistant against impact than glasses as the memory medium. Theoretical details of nuclear magnetic resonance are described, for example, in C. P. Slichter, "Principles of Magnetic Resonance," 3rd Edition, Springer-Verlag, 1990, Sections 1 and 2, pp. 1~59, etc. Note that, in the following embodiment, since resonance is used, the devices explained in FIG. 1A, FIG. 1B, FIG. 1C, and FIG. 2 described above become unnecessary.

First, there is no restriction of the memory area of the data as in FIG. 2. Furthermore, a device that gives anisotropy to the pitch as was explained in FIG. 1A, FIG. 1B, and FIG. 1C is unnecessary even if the memory medium is tabular except for the case where limitation can be imposed to the rotation angle mechanically.

On the other hand, a format of a reduced number of '1s' as in FIG. 3 and FIG. 4 has the same effect as the embodiment explained so far in decreasing writing processes and increasing the reliability.

Figure 11:
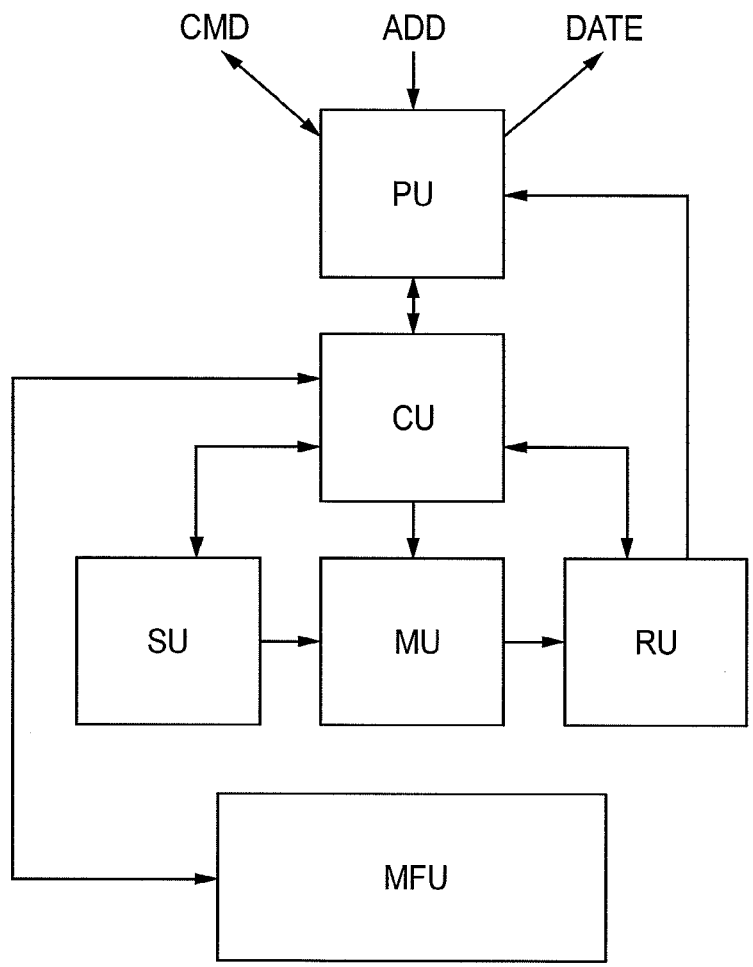
FIG. 11 is a block diagram showing another one example of a configuration of the information storage device of the present invention.

FIG. 11 shows a block diagram of main components (hereinafter called a unit) which constitute the embodiment. Arrows shown in this block diagram indicate flows of the data, the control signals, etc. among the respective blocks. CMD is the command signal, ADD is the address, and DATA is the data.

In FIG. 11, MU is the memory unit and stores the data DATA in small segments arranged three-dimensionally. As shapes of the memory medium MM constituting the MU, various shapes, such as a cylindrical shape, a square pillar shape, the tabular shape, etc. are considered. SU is a sending unit, which sends the electromagnetic wave toward the memory unit MU. RU is the receiving unit, which receives the electromagnetic wave that is transmitted through the memory unit MU or is emitted from the MU. PU is an arithmetic unit, performs a signal processing on the reception signal given from the receiving unit RU, and calculates an arrangement and values of the data stored in the memory unit MU. MFU is a magnetic field generating unit and is for giving a required magnetic field to the memory unit. CU is the control unit and controls rotation, an up and down movement, a gradient, etc. of the MU. Moreover, when the data is recorded with the mode of expression shown in FIG. 3 and FIG. 4, the data may be outputted after the arithmetic unit PU performs code conversion to convert the data into an 8-bit code. Thereby, the interface to be connected with an external processor etc. can be constructed having a usually used bit width, such as 8-bits and 16-bits.

In this embodiment, upon input of the read command and the address into the arithmetic unit PU from the outside, the arithmetic unit PU outputs a value of data corresponding to the inputted address. The specific reading operation will be described latter. Incidentally, in the following, explanations are omitted regarding a method for generating an electromagnetic wave, a magnetic field, and an electric field, a method for receiving an electromagnetic wave, and signal processings of spectral analysis, etc. These are described in textbooks of electric engineering, and any engineer having common knowledge can design necessary devices.

Figure 12:
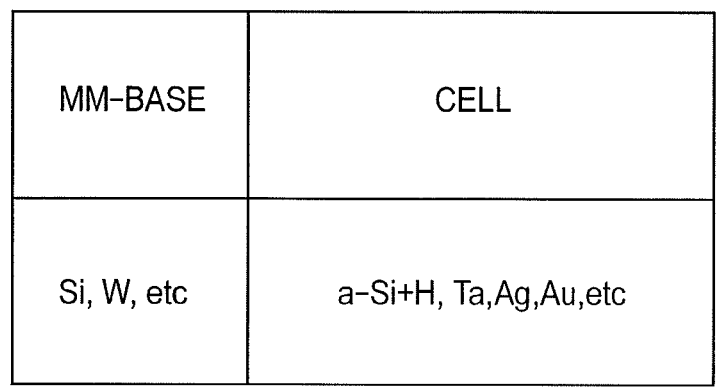
FIG. 12 is a diagram showing a material of the memory medium suitable for the configuration of FIG. 11.

FIG. 12 shows an example of a substance suitable for recording the data in the embodiment of FIG. 11. This embodiment is an embodiment of a substance in the case where absorption or emission of the electromagnetic wave by nuclear magnetic resonance is used for the reading.

As a materials of a portion of the memory medium MM other than the memory cell, silicon (Si), tungsten (W), etc. can be used to construct that portion. Silicon has merits that it is a stable substance and is suited for long-term preservation, and that is easy to procure because a large quantity of it has come in the market for integrated circuits. Since tungsten is metal, it has a merit that it is harder to crack than silicon and glasses and also its melting point is high.

The memory cell that is a minute area for recording the data can use elements each of which has an odd number of either neutrons or protons or odd numbers of the both, for example, substances each including hydrogen (H), tantalum (Ta), silver (Ag), gold (Au), etc. These are not needed to be used as pure elements, and if they are used as compounds or mixtures, the resonance phenomenon can be used only accompanied with a difference in characteristics, such as the resonant frequency. Incidentally, if hydrogen is used for the memory cell, since it is difficult for gas to be fixed at a position of the memory cell, what is necessary is just to use it after it is bound to amorphous silicon. Nuclear magnetic resonance is a property that the element itself has, and since the property itself does not deteriorate, it is suitable for the long-term preservation of the data. Moreover, as a substance constituting the memory cell, any substance can do that causes at least one resonance phenomenon of electron spin resonance, ferromagnetic resonance, and antiferromagnetic resonance in addition to nuclear magnetic resonance.

Thus, a material whose absorption and emission of the electromagnetic wave can be ignored or whose absorption and emission of the electromagnetic wave at least to the memory cells is used as a material of a portion other than the memory cell of the memory medium MM, and a material that makes the memory cell cause nuclear magnetic resonance is used. Thereby, this makes it possible to store information using a property of an element itself of the material constituting the memory cell and makes it possible to memorize the information in a nonvolatile fashion.

However, depending on a combination of a substance constituting the memory cell and a substance constituting the memory medium, it is considerable that even if it is the solid body, the substance constituting the memory cell diffuses inside the memory medium, which interferes the reading. In that case, the following measures are effective: selecting a combination of substances whose diffusion constants are small; providing a barrier layer for preventing the diffusion in the memory cell portion; etc.

Moreover, it is also possible that the memory medium MM is formed informally using a material with a substance for the memory cell described in FIG. 12 mixed, the local thermal modification is caused locally in the portion constituting the memory cell, and the data is written. As a result of this thermal modification, it is possible to vary a response characteristic of the electromagnetic wave similarly with a phenomenon that is so called chemical shift. Although naturally the element itself that causes nuclear magnetic resonance is not modified, change of structures of surrounding molecules or change of a local density of the element causing magnetic resonance can modulate a relaxation time of the electromagnetic wave of a specific frequency and its intensity in an absorption or emission spectrum. Therefore, it becomes possible to acquire the same effect as that of the case where a substance other than the memory cell and a substance of the memory cell are made different from each other. Incidentally, in contrast to JP-A-H11 (1999)-102584, since the memory cell obtained by the thermal modification exists stably even if no magnetic field etc. is applied thereto from the outside, it becomes possible to memorize the data in a nonvolatile fashion. In this case, materials used for the memory medium MM can be reduced to a single material. However, since although absorption and emission of the electromagnetic wave is performed also in MM-BASE, differences of the absorption and emission of the electromagnetic wave can be obtained by the thermal modification, the data can be read.

In order to cause the local thermal modification in the above, a method where the resonance absorption of the electromagnetic wave is used, a method where the powerful electromagnetic wave, such as a laser, is focused locally, etc. can be used. Since these methods will be described latter about an embodiment of FIG. 16B, these are omitted here.

Figure 13:
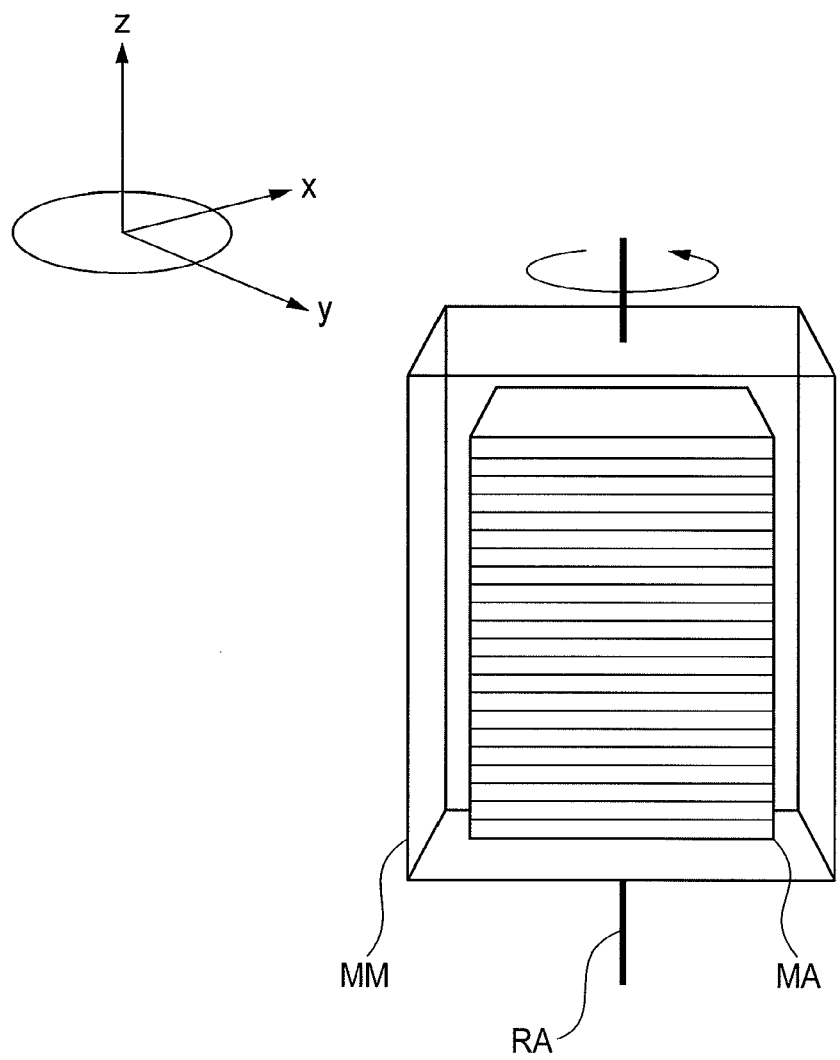
FIG. 13 is a diagram showing a principle of a reading method suitable for the configuration of FIG. 11.
Figure 14:
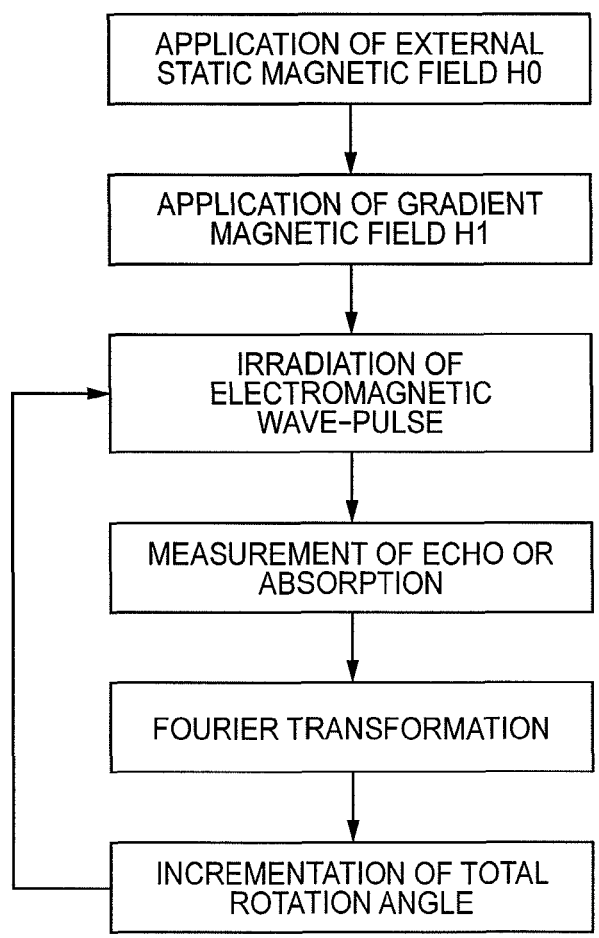
FIG. 14 is a diagram showing a procedure of the reading method suitable for the configuration of FIG. 11.

Below, a method for reading the data by nuclear magnetic resonance will be described using embodiments of FIGS. 13 and 14. FIG. 13 is an embodiment showing rotation of the memory medium required for the method, and FIG. 14 is an embodiment showing a procedure of the reading. In FIG. 13, a gradient magnetic field that has dependability only in the z-direction and the x-direction is applied. For example, in the case where 1000 memory cells are arranged with an equal gap in the x-, y-, and z-directions, space coordinate dependability of the gradient magnetic field H may be set to $H(x, z)=1000 (z/P)+x/P \ldots (1.5)$ or the like. Incidentally, x and z become 0P, 2P, 3P to 999P, respectively. Then, the electromagnetic wave is irradiated from the y-direction. A spectrum of the electromagnetic wave absorbed or emitted at that time is obtained and the data is collected while making the memory medium rotate little by little about the z-axis. Thus obtained specific frequency component of the electromagnetic wave observed at a certain rotation angle θ represents an integration of an intensity of the electromagnetic wave that is absorbed into or radiated from the memory cell in the y-axis direction in the z-x coordinates, i.e., in a radiation direction of the electromagnetic wave. That is, what is mathematically equivalent to the projection image of the computer tomography is obtained. Here, by rotating the memory medium MM around the z-axis, each integration value in the y-axis direction at each cross section perpendicular to the z-axis can be measured for one rotation. If the integration value for one rotation is successfully measured, the computer tomography will become possible and high-speed data reading will be able to be made.

Figure 15:
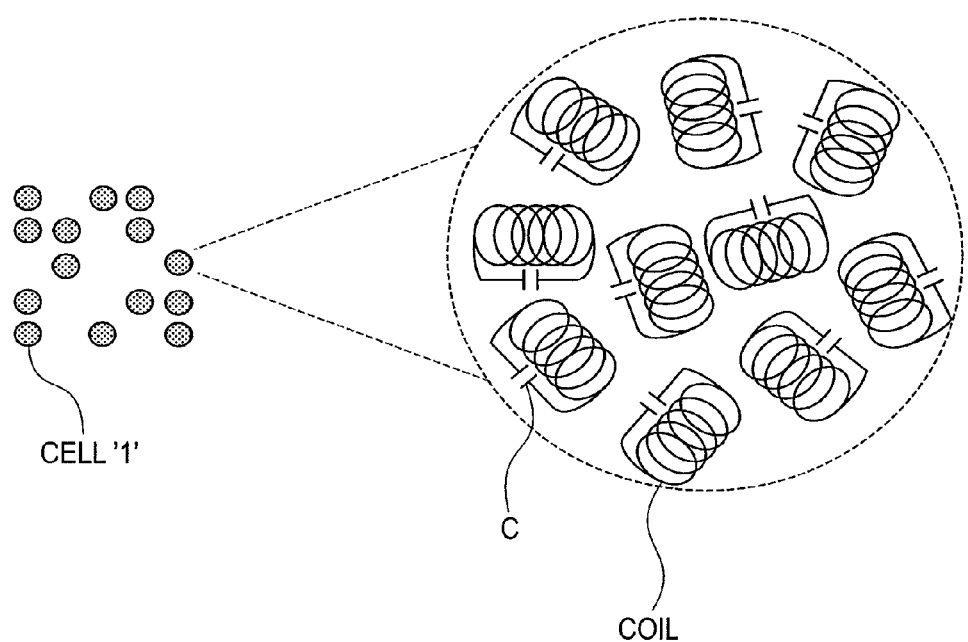
FIG. 15 is a diagram of a memory cell to which a resonant circuit using a minute coil suitable for the configuration of FIG. 11 is applied.

Incidentally, in order to obtain the data of a high SN ratio in nuclear magnetic resonance, it is necessary to apply a powerful magnetic field to the memory medium MM, as is well known. However, depending on a case, generation of the powerful magnetic field may be difficult because of an enlarged device or large electric power consumption (in the case of an electromagnet). In that case, an embodiment as shown in FIG. 15 is effective.

In this embodiment, a resonant circuit consisting of a minute coil and a capacitance is sealed in the memory cell portion. The minute resonant circuit can be formed, for example, with carbon. Its manufacture method is described, for example, in Japanese Patent No. 3011378. Such a minute coil formed with carbon is called a carbon microcoil, a carbon nanocoil, or the like by size. It is possible that the resonant frequency with the electromagnetic wave can be set to be in a region of light in the case of a carbon nanocoil of a nanometer size, and it can be set to be in a region of a high-frequency electric wave, so that the present invention can be applied according to the resonant frequency. The former case is being examined to be applied to the lens having a negative refractive index etc., and the latter is used as an electromagnetic shielding material, for example.

In order to carry out the embodiment of FIG. 13, it is necessary to give space dependency to the resonant frequency. Since in the minute coil made of carbon, a spurious capacitance by a dielectric surrounding the coil acts as a capacitor of a resonant circuit, space coordinate dependability can be given to the resonant frequency by applying a gradient electric field instead of the magnetic field. Incidentally, instead of applying the gradient electric field, it is also possible to use coils each having a different number of turns according to space coordinates of the memory cell, or coils each of whose filler for fixing the coil has a different magnetic permeability. This makes it unnecessary to generate the gradient electric field.

Thus, inclusion of the coil in the memory cell brings a merit that the external magnetic field formed by a special permanent magnet or an electromagnet that consumes a large amount of current is not required. Incidentally, the memory cell is arranged three-dimensionally in the memory area MA inside the memory medium MM, as has been described so far.

Figure 16A:
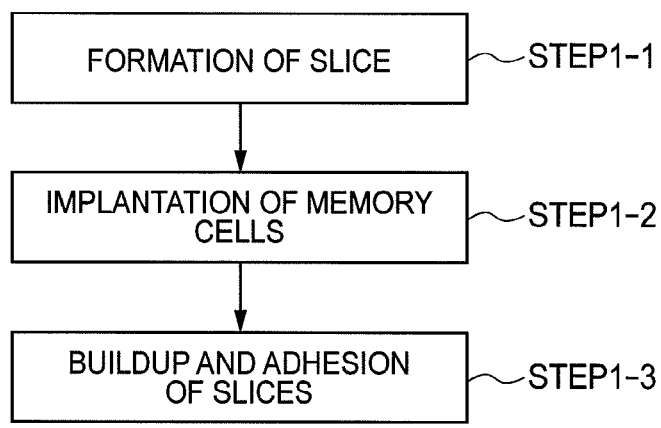
FIG. 16A is a diagram showing a method for manufacturing the memory medium MM suitable for the configuration of FIG. 11.

In such a manufacture method of the memory medium MM in which memory cells are arranged three-dimensionally, various manufacture methods are conceivable. Among them, a method that makes the manufacture easy will be explained using FIGS. 16A and 16B. FIG. 16A shows a manufacture method in the case where the MM-BASE and the memory cell are constructed with different substances. First, for example, a slice of the disk-like memory medium is prepared in advance with a wafer, such as of silicon (STEP1-1). Next, through holes are opened at desired positions in the slice, and the memory cell material of FIG. 14 is implanted therein (STEP1-2). Then, a plurality of slices in each of which the memory cell material is implanted at STEP2 are layered one on top of another and adhered together to form one memory medium MM (STEP1-3). Thus, since manufacture of the memory medium makes it possible to write the data in each slice, a price can be lowered when manufacturing it in large quantity.

Figure 16B:
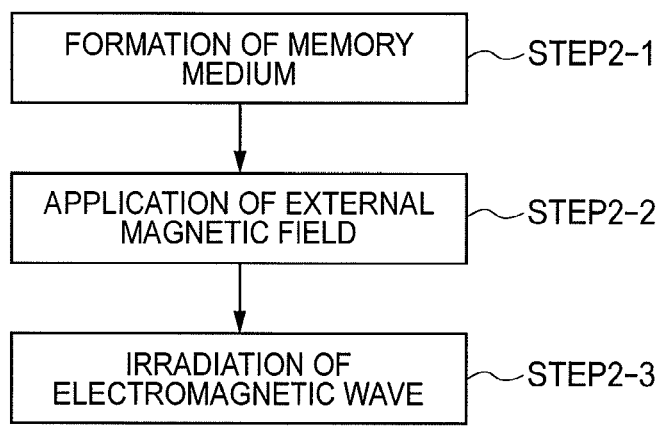
FIG. 16B is a diagram showing a method for manufacturing the memory medium MM when the memory cell is constructed by thermal modification.

FIG. 16B shows a manufacture method in the case of constructing the memory cell by the thermal modification. First, the memory medium MM is formed uniformly using a material in which the substances for memory cell described in FIG. 12 are mixed (STEP2-1). Next, by an external magnetic field, the resonant frequency inside the memory area MA in the interior of the medium is made to differ for every space coordinates (STEP2-2). Then, a powerful electromagnetic wave that has the resonant frequency of the memory cell whose data is intended to be changed in this state is irradiated (STEP2-3). By doing this, the thermal modification can be arisen selectively in the memory cell having that resonant frequency. Incidentally, irradiation by laser can also make the thermal modification occurs instead of using the external magnetic field and the electromagnetic wave. In the case where the external magnetic field and the electromagnetic wave are used, since permeability of the substance is good, a range of selections of substances can be expanded. On the other hand, when a laser is used, it is necessary to select a substance through which the laser passes as a substance of the memory medium. Although the range of selections of materials becomes narrow, this case has a merit that the writing at a necessary position becomes possible by controlling a position of the lens for focusing the laser, and consequently the writing becomes easy. It is possible that in the case of laser, if light of a short pulse laser, especially of the femtosecond laser etc., is focused, even in the case of a medium that allows a wavelength of the laser to pass through, it will cause the modification in the interior thereof.

From the forgoing, according to the embodiments that use magnetic resonance having been described from FIG. 11 described above, since the data is preserved three-dimensionally, it is possible to perform highly integrated storage without depending on the micro fabrication as compared to the two-dimensional storage, such as a common semiconductor storage device. Moreover, unlike the method described in JP-A-H06 (1994)-076374, since the memory cell is made up of a different substance from that of the memory medium MM and stores the data, the data is memorized in a nonvolatile fashion even if there is no external magnetic field. Furthermore, since the data is preserved being sealed in the medium in a solid state and is read in a noncontact manner, it is possible to preserve the data for a long time. That is, if the medium is preserved in a case that intercepts electromagnetic waves, the data will not be lost with a usual temperature and humidity.

In the embodiments so far described, although pieces of stored the data are arranged three-dimensionally in the solid body and those coordinates are calculated by a response with a radio wave etc. and by the arithmetic operation, at this time, if the data serving as a reference of coordinates are recorded as signpost in addition to the original data, it will be convenient. For example, it is possible to store a signpost serving as a reference of a starting point and an ending point of the rotation angle, a signpost serving as a reference of the rotation axis, a signpost indicating a range of the memory area of the data and a number of a layer, etc. at desired positions by the same method as that of the data. If these exists, not only they can serve as a reference for installing the medium in the reading device, but also they can be used as reference data when an aberration of the lens, an error of the magnetic field to be applied, etc. are corrected by the arithmetic processing from the read data. According to the present invention, since the data can be sealed and preserved in the interior of the robust memory medium, this embodiment is suitable for archiving the data of precious images and documents or cultural properties as the digital data over a very long time.

In the foregoing, although the invention made by the present inventors was explained concretely based on the embodiments, it is natural that the present invention is not limited to the embodiments and can be modified and devised variously within a range that does not deviate from the gist and spirit thereof.

The information storage device according to the present invention enables improvement in a storage density by arranging the memory cells three-dimensionally. Moreover, since the memory area MA is sealed inside the memory medium MM that is a solid, it becomes possible to preserve information robustly and for a long time.

Specifically, by giving anisotropy to the pitch of the memory cell of the information recorded inside the memory medium three-dimensionally, it becomes possible to read the information stably using a technique of the computer tomography even if there is a limitation to a range in which a relative rotation angle between the medium and the electromagnetic wave irradiating the medium can be varied.

Furthermore, it is possible to avoid a situation where information from a part of memory cells cannot be obtained depending on the rotation angle by using an area included in a portion on which the electromagnetic wave always fall as the record area under a limitation of the rotation angle.

Moreover, text data and binary data which were coded in the unit of n-bits are converted into expressions each of which is digital data of m-bits larger than n and each of whose upper limit of the number of '1s' is limited to k smaller than n, and are recorded, whereby writing steps can be curtailed, and improvement in a manufacture speed of the memory medium and cost down thereof become possible. By arranging the m-bit code in a direction right-angled to the plate, it is expectable that the number of the memory cells of '1s' that are observed being overlapping on the projection image decreases. Since for this reason, it can be avoided that the intensity of the transmitted light decreases extremely, the reliability of the reading can be prevented from decreasing due to a shortage of a dynamic range or the SN ratio of the receiving side.

Form the above, the present invention can be used to preserve, for example, official documents and images, audio, and the text data relevant to cultural properties, or to preserve gene information of scarce lives that are considered to be in danger of extinction and pass them over to future generations.

Incidentally, if metadata including a creation time and date, a title indicating a storage content, a creator, a reading method, etc. is added to the memory medium according to the present invention, information relevant to the storage contents can be found even if a long period of time elapsed since it was formed, and it will be very convenient. It is natural that this metadata may be written in the memory medium in a format that can be read by the method of the embodiment, and may be stored as a character pattern or geometrical pattern that is intelligible so that it can be easily discriminated. Incidentally, in present A.D., it is not improbable that especially information on time and date comes ambiguous in correspondence with a new calendar in far future. In such a case, it is good to store astronomical phenomena, for example, of positions of a star and a planet, or a solar eclipse, etc. together with A.D. A star varies its relative position and a position from the celestial north pole due to its proper motion and a precession of the earth in a period of a few hundred years to a few thousand years. Moreover, a planet changes its position to a star every day by revolution of the earth whose period is about one year and a revolution of the planet itself whose period is several years to a few tens of years. If there is further information of a solar eclipse, etc. in addition to these pieces of information, it will become possible to presume a date quite correctly.

What is claimed is:

1. A memory medium for recorded information comprising:
   a single body of material with a plurality of minute areas of recorded information therein and having a first plane,
   the plurality of minute areas of recorded information being arranged to form at least one layer that is substantially parallel to the first plane,
   wherein the single body of material is configured to be arranged with respect to an electromagnetic wave source such that $n=\sin(\theta b)/\sin(\theta i)$
   where n is a refractive index of the memory medium,
   $\theta i$ is an angle between a direction of propagation of an incident electromagnetic wave in an interior of the single body of material between minutes areas and a normal of the first plane the single body of material is irradiated by the incident electromagnetic wave,
   $\theta b$ is an angle between the direction of propagation of the incident electromagnetic wave and the normal of the first plane at which reflectance of a P-polarization component of the incident electromagnetic wave from the first plane is zero,
   wherein the plurality of minute areas are arranged such that $Sx/Dy>\tan(\theta im)$,
   where Dy is a size of each minute area in a direction perpendicular to the first plane,
   Sx is the spacing between adjacent minute areas in a direction parallel to the first plane, and
   $\theta im$ is a maximum angle between a direction of propogation of the incident electromagnetic wave in the interior of the single body of material and the normal of the first plane.

2. A memory medium according to claim 1, wherein said single body of material is glass, a transparent plastic, alumina or ceramic.

3. A memory medium according to claim 1,
   wherein $\theta b \leq \theta a$ is satisfied,
   where $\theta a$ is an angle between a direction of propagation of the incident electromagnetic wave in air and the normal of the first plane.

4. A memory medium according to claim 3, wherein a sectional shape of said minute areas is substantially square, rectangular, or circular.

5. A memory medium according to claim 3, wherein the single body of material has a tabular shape.

6. A memory medium according to claim 3, wherein at least one of red, green, and blue color components is recorded in the minute areas.

7. a memory medium according to claim 3, further comprising a case that intercepts electromagnetic waves and preserves the single body of material therein.

8. A memory medium according to claim 3, wherein a reference of coordinate is recorded in the single material body.

9. A memory medium according to claim 3, wherein at least one of a creation time, creation date, a title, a creator, and a reading method is recorded in the single body of material.

10. A memory medium for recorded information comprising:
    a single body of material having a plurality of minute areas of recorded information therein and a first plane,
    a plurality of minute areas recorded information being arranged three dimensionally,
    wherein the single body of material is configured to be arranged with respect to an electromagnetic wave source such that the following are satisfied: $n=\sin(\theta a)/\sin(\theta im)$, $Sx/Dy>\tan(\theta im)$, and $(Sx+Dx)/(Sy+Dy)<\tan(\theta im)$ where n is a refractive index of the single body of material,
θim is a maximum angle between a direction of propagation of an incident electromagnetic wave from said source in an interior of the single body of material and a normal of the first plane when the single body of material is irridated by the incident electromagnetic wave,
θa is an angle between a direction of propagation of the incident electromagnetic wave in air and the normal of the first plane,
Dx is a size of each minute area in a direction parallel to the first plane,
Dy is a size of each minute area in a direction perpendicular to the first plane,
Sx is a spacing between adjacent minute areas in the direction parallel to the first plane, and
Sy is a spacing between adjacent minute areas in the direction perpendicular to the first plane.

11. A memory medium storing recorded information and comprising: a single body of material with a plurality of minute areas of recorded information therein and having a first plane, the plurality of minute areas of recorded information being arranged three dimensionally, wherein the single body of material has a number (n) of recordable planes in a data area thereof, each recordable plane being parallel to the first plane, corresponding recorded minute areas on the (n) recordable planes are disposed along respective lines perpendicular to the first plane, and for every such line (i) perpendicular to the first plane after all information to be stored is recorded in the memory medium, a number (mi) of recorded minute areas along the respective line is less than the number (n) of the recordable planes in the data area, each line (i) representing a unit of digital information constituted by (n) bits.

12. A memory medium according to claim 11, wherein the number ($m_i$) of recorded minute areas along each respective line does not exceed a predetermined maximum that is less than less the number (n) of the recordable planes.

13. A memory medium according to claim 12, wherein said single material body is glass, a transparent plastic, alumina or ceramic.

14. A memory medium according to claim 12, wherein said single body of material has a tabular shape.

15. A memory medium according to claim 12, further comprising a case that intercepts electromagnetic waves and preserves the single body of material therein.

16. A memory medium according to claim 12, wherein at least one of a creation time, creation date, a title, a creator, a reading method is recorded in the single body of material.

17. An information processing system comprising:
a memory medium recorded information which comprises a single body of material having a first plane and a plurality of minute areas recorded information, the plurality of minute areas being arranged in the single body of material to form at least one layer that is substantially parallel to the first plane;
a lighting unit for irradiating the memory medium with an incident electromagnetic wave; and
a receiving unit for receiving an electromagnetic wave from the memory medium,
wherein the single body of material is configured to be arranged with respect to the lighting unit such that n=sin(θb)/sin(θi),
where n is a refractive index of the memory medium,
said θi is an angle between a direction of propagation of an incident electromagnetic wave in an interior of the single body of material between the minute areas and a normal of the first plane when the single body of material is irradiated by the incident electromagnetic wave,
θb is an angle between the direction of propagation of the incident electromagnetic wave and the normal of the first plane at which reflectance of a P-polarization component of the incident electromagnetic wave from the first plane is zero,
wherein the plurality of minute areas are arranged such that Sx/Dy >tan(θim),
where Dy is a size of each minute area in a direction perpendicular to the first plane,
Sx is the spacing between adjacent minute areas in a direction parallel to the first plane, and
θim is a maximum angle between a direction of propagation of the incident electromagnetic wave in the interior of the single body of material and the normal of the first plane.

18. A memory medium according to claim 1, wherein a conversion rule is recorded in the single body of material.

19. An information processing system according to claim 17, wherein a conversion rule is recorded in the single body of material.

20. A memory medium according to claim 1, wherein θa ≤90° is satisfied, where θa is an angle between the direction of propagation of the incident electromagnetic wave in air and the normal of the first plane.

* * * * *